US006834275B2

(12) United States Patent
Kanai et al.

(10) Patent No.: US 6,834,275 B2
(45) Date of Patent: *Dec. 21, 2004

(54) TRANSACTION PROCESSING SYSTEM USING EFFICIENT FILE UPDATE PROCESSING AND RECOVERY PROCESSING

(75) Inventors: Tatsunori Kanai, Kanagawa (JP); Osamu Torii, Kanagawa (JP); Toshiki Kizu, Kanagawa (JP); Seiji Maeda, Kanagawa (JP); Hiroshi Yao, Kanagawa (JP); Hirokuni Yano, Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/307,974

(22) Filed: Dec. 3, 2002

(65) Prior Publication Data

US 2003/0078910 A1 Apr. 24, 2003

Related U.S. Application Data

(63) Continuation of application No. 09/660,461, filed on Sep. 12, 2000, now Pat. No. 6,519,614.

(30) Foreign Application Priority Data

Sep. 29, 1999 (JP) .......................................... 11-276264

(51) Int. Cl.[7] .......................... G06F 17/30; G06F 12/00
(52) U.S. Cl. ........................ 707/1; 707/102; 707/104.1; 707/202
(58) Field of Search ............................ 707/1, 202, 102, 707/104.1

(56) References Cited

U.S. PATENT DOCUMENTS

| 4,791,556 | A | * | 12/1988 | Vilkaitis | 345/835 |
|---|---|---|---|---|---|
| 5,201,044 | A | * | 4/1993 | Frey et al. | 714/20 |
| 5,455,944 | A | * | 10/1995 | Haderle et al. | 707/202 |
| 5,471,615 | A | * | 11/1995 | Amatsu et al. | 709/202 |
| 5,504,883 | A | * | 4/1996 | Coverston et al. | 707/202 |
| 5,504,899 | A | * | 4/1996 | Raz | 707/10 |
| 5,522,066 | A | * | 5/1996 | Lu | 707/1 |
| 5,530,848 | A | * | 6/1996 | Gilbert et al. | 709/313 |
| 5,586,312 | A | * | 12/1996 | Johnson et al. | 707/10 |
| 5,594,900 | A | * | 1/1997 | Cohn et al. | 707/202 |
| 5,613,060 | A | * | 3/1997 | Britton et al. | 714/15 |
| 5,712,971 | A | * | 1/1998 | Stanfill et al. | 714/34 |
| 5,857,204 | A | | 1/1999 | Lordi et al. | |
| 6,519,614 | B1 | * | 2/2003 | Kanai | 707/202 |

FOREIGN PATENT DOCUMENTS

EP 0 454 340 10/1991

OTHER PUBLICATIONS

Apers, Peter M.G. et al., "Prisma?DB A Parallel, Main Memory Relational DBMS", Dec. 1992, IEEE Transactions on Knowledg and Data Engineering, vol. 4, No. 6, pp. 541–554.*

Boral, Haran et al., Prototypong Bubba, A Highly Parallell Database System, Mar. 1990, IEEE Transactions on Knowledge an Data Engineering, vol. 2, No. 1, pp. 4–23.*

(List continued on next page.)

Primary Examiner—Frantz Coby
(74) Attorney, Agent, or Firm—Oblon, Spivak, McClelland, Maier & Neustadt, P.C.

(57) ABSTRACT

A transaction processing system capable of easily and efficiently realizing the file update processing by a plurality of transactions operating in parallel as well as the recovery processing at a time of a fault occurrence is disclosed. In the transaction processing system, a plurality of transactions that carry out update processing with respect to one file read out onto a buffer region are executed, and that one file is written into a stable memory device at a time of commit of one transaction among the plurality of transactions, where that one file contains a content of committed updates made by that one transaction and a content of non-committed updates made by other non-committed transactions, and information for cancelling the non-committed updates.

8 Claims, 42 Drawing Sheets

OTHER PUBLICATIONS

DeWitt, David J., et al., The Gamma Database Machine Project, Mar. 1990, IEEE Transactions on Knowledge and Data Engineering vol. 2, No. 1, pp. 44–62.*

Frieder, Ophir and Chaitanya K. Baru, Site and Query Scheduling Policies in Multicomputer Database Systems, Aug. 1994, IEEE Transactions on Knowledge and Data Engineering, vol. 6, No. 4, pp. 609–619.*

Graefe, Goetz, Volcano An Extensible and Parallell Evaluation System, Feb. 1994, IEEE Transactions on Knowledge Data Engineering, vol. 6, No. 1, pp. 120–135.*

Graefe Goetz and Diane L. Davison, Encapsulation of Parallelism and Architecture, Independence in Extensible Database Query Execution, Aug. 1993, IEEE Transactions on Software Engineering, vol. 19, No. 8. pp. 749–764.*

J. Gray, et al., Transaction Processing: Concepts and Techniques, pp. 688–723, XP-002232495, "Transaction Processing: Concepts and Techniques", 1993.

J. Gray, et al., Transaction Processing: Concepts and Techniques, pp. 724–732, XP-002194027, "Transaction Processing: Concepts and Techniques".

R. Kroeger, et al., International Workshop on Computer Architechture to Support Security and Persistence of Information, pp. 339–355, XP-000619867, "The Relax Transactional Object Management System", May 8, 1990.

M. R. Brown, et al., ACM Transaction on Computer Systems, vol. 3, No. 4, pp. 261–293, XP-000039672, "The Alpine File System", Nov. 1, 1985.

* cited by examiner

FIG.2

| FILE | TRANSACTIONS TO BE UPDATED |
|---|---|
| F0102 | 36,21,5 |
| F2156 | 6, |
| F3624 | 23,6 |
| ⋮ | |
| F7531 | 5,1 |

FIG.3

| TRANSACTION | FILE |
|---|---|
| 3 | F9268 |
| 5 | F0100,F9264 |
| 6 | F2164,F1234 |
| 21 | F0104 |
| ⋮ | |
| NOTX | F0102,F2156,F3624,F5497,F7531 |

FIG.4

```
<KVtable>
   <entry>
      <key>APPLE</key>
      <value>¥400</value>
   </entry>
   <entry>
      <key>BISCUIT</key>
      <value>¥250</value>
   </entry>
   <entry>
      <key>CHOCOLATE</key>
      <value>¥200</value>
   </entry>
   <entry>
      <key>GRAPE</key>
      <value>¥600</value>
   </entry>
</KVtable>
```

FIG.5

```
<KVtable>
   <entry>
      <key>APPLE</key>
      <value>¥400</value>
   </entry>
   <entry>
      <key>BISCUIT</key>
      <value>¥250</value>
   </entry>
   <entry>
      <key>CHOCOLATE</key>
      <value>¥200</value>
   </entry>
   <entry>
      <key>GRAPE</key>
      <value>¥600</value>
   </entry>
   <entry TXID="1" TXSTATE="UPDATE">
      <key>ICECREAM</key>
      <value>¥450</value>
   </entry>
</KVtable>
```

FIG.6

```xml
<KVtable>
   <entry TXID="3" TXSTATE="UPDATE">
      <key>APPLE</key>
      <value>¥500</value>
      <oldvalue>¥400</oldvalue>
   </entry>
   <entry>
      <key>BISCUIT</key>
      <value>¥250</value>
   </entry>
   <entry>
      <key>CHOCOLATE</key>
      <value>¥200</value>
   </entry>
   <entry>
      <key>GRAPE</key>
      <value>¥600</value>
   </entry>
   <entry TXID="1" TXSTATE="UPDATE">
      <key>ICECREAM</key>
      <value>¥450</value>
   </entry>
</KVtable>
```

FIG.7

```
<KVtable>
   <entry TXID="3" TXSTATE="UPDATE">
      <key>APPLE</key>
      <value>¥500</value>
      <oldvalue>¥400</oldvalue>
   </entry>
   <entry TXID="2" TXSTATE="REMOVE">
      <key>BISCUIT</key>
      <value>¥250</value>
   </entry>
   <entry>
      <key>CHOCOLATE</key>
      <value>¥200</value>
   </entry>
   <entry>
      <key>GRAPE</key>
      <value>¥600</value>
   </entry>
   <entry TXID="1" TXSTATE="UPDATE">
      <key>ICECREAM</key>
      <value>¥450</value>
   </entry>
</KVtable>
```

FIG.8

```
<KVtable>
   <entry TXID="3" TXSTATE="UPDATE">
      <key>APPLE</key>
      <value>¥500</value>
      <oldvalue>¥400</oldvalue>
   </entry>
   <entry TXID="2" TXSTATE="REMOVE">
      <key>BISCUIT</key>
      <value>¥250</value>
   </entry>
   <entry TXID="2" TXSTATE="UPDATE">
      <key>CHOCOLATE</key>
      <value>¥300</value>
      <oldvalue>¥200</oldvalue>
   </entry>
   <entry>
      <key>GRAPE</key>
      <value>¥600</value>
   </entry>
   <entry TXID="1" TXSTATE="UPDATE">
      <key>ICECREAM</key>
      <value>¥450</value>
   </entry>
</KVtable>
```

FIG.9

```
<KVtable>
   <entry TXID="3" TXSTATE="UPDATE">
      <key>APPLE</key>
      <value>¥500</value>
      <oldvalue>¥400</oldvalue>
   </entry>
   <entry TXID="2" TXSTATE="REMOVE">
      <key>BISCUIT</key>
      <value>¥250</value>
   </entry>
   <entry TXID="2" TXSTATE="UPDATE">
      <key>CHOCOLATE</key>
      <value>¥300</value>
      <oldvalue>¥200</oldvalue>
   </entry>
   <entry TXID="1" TXSTATE="REMOVE">
      <key>GRAPE</key>
      <value>¥600</value>
   </entry>
   <entry TXID="1" TXSTATE="UPDATE">
      <key>ICECREAM</key>
      <value>¥450</value>
   </entry>
</KVtable>
```

FIG.10

```xml
<KVtable>
   <entry TXID="3" TXSTATE="UPDATE">
      <key>APPLE</key>
      <value>¥500</value>
      <oldvalue>¥400</oldvalue>
   </entry>
   <entry TXID="2" TXSTATE="REMOVE">
      <key>BISCUIT</key>
      <value>¥250</value>
   </entry>
   <entry TXID="2" TXSTATE="UPDATE">
      <key>CHOCOLATE</key>
      <value>¥300</value>
      <oldvalue>¥200</oldvalue>
   </entry>
   <entry TXID="1" TXSTATE="REMOVE">
      <key>GRAPE</key>
      <value>¥600</value>
   </entry>
   <entry TXID="1" TXSTATE="UPDATE">
      <key>ICECREAM</key>
      <value>¥450</value>
   </entry>
   <entry TXID="2" TXSTATE="UPDATE">
      <key>KIWIFRUIT</key>
      <value>¥300</value>
   </entry>
</KVtable>
```

FIG.11

```
<KVtable>
   <entry>
      <key>APPLE</key>
      <value>¥500</value>
   </entry>
   <entry TXID="2" TXSTATE="REMOVE">
      <key>BISCUIT</key>
      <value>¥250</value>
   </entry>
   <entry TXID="2" TXSTATE="UPDATE">
      <key>CHOCOLATE</key>
      <value>¥300</value>
      <oldvalue>¥200</oldvalue>
   </entry>
   <entry TXID="1" TXSTATE="REMOVE">
      <key>GRAPE</key>
      <value>¥600</value>
   </entry>
   <entry TXID="1" TXSTATE="UPDATE">
      <key>ICECREAM</key>
      <value>¥450</value>
   </entry>
   <entry TXID="2" TXSTATE="UPDATE">
      <key>KIWIFRUIT</key>
      <value>¥300</value>
   </entry>
</KVtable>
```

FIG.12

```
<KVtable>
   <entry>
      <key>APPLE</key>
      <value>¥500</value>
   </entry>
   <entry TXID="2" TXSTATE="REMOVE">
      <key>BISCUIT</key>
      <value>¥250</value>
   </entry>
   <entry TXID="2" TXSTATE="UPDATE">
      <key>CHOCOLATE</key>
      <value>¥300</value>
      <oldvalue>¥200</oldvalue>
   </entry>
   <entry>
      <key>ICECREAM</key>
      <value>¥450</value>
   </entry>
   <entry TXID="2" TXSTATE="UPDATE">
      <key>KIWIFRUIT</key>
      <value>¥300</value>
   </entry>
</KVtable>
```

FIG.13

```
<KVtable>
   <entry>
      <key>APPLE</key>
      <value>¥500</value>
   </entry>
   <entry>
      <key>BISCUIT</key>
      <value>¥250</value>
   </entry>
   <entry>
      <key>CHOCOLATE</key>
      <value>¥200</value>
   </entry>
   <entry>
      <key>ICECREAM</key>
      <value>¥450</value>
   </entry>
</KVtable>
```

FIG.15

```
<KVtable>
  <entry>
    <key>APPLE</key>
    <value>¥400</value>
  </entry>
  <entry>
    <key>BISCUIT</key>
    <value>¥250</value>
  </entry>
  <entry TXID="4" TXSTATE="READ">
    <key>CHOCOLATE</key>
    <value>¥200</value>
  </entry>
  <entry>
    <key>GRAPE</key>
    <value>¥600</value>
  </entry>
</KVtable>
```

FIG.21

```
<KVtable TXNUM="2">
  <entry>
     <key>APPLE</key>
     <value>¥500</value>
  </entry>
  <entry TXID="2" TXSTATE="REMOVE">
     <key>BISCUIT</key>
     <value>¥250</value>
  </entry>
  <entry TXID="2" TXSTATE="UPDATE">
     <key>CHOCOLATE</key>
     <value>¥300</value>
     <oldvalue>¥200</oldvalue>
  </entry>
  <entry TXID="1" TXSTATE="REMOVE">
     <key>GRAPE</key>
     <value>¥600</value>
  </entry>
  <entry TXID="1" TXSTATE="UPDATE">
     <key>ICECREAM</key>
     <value>¥450</value>
  </entry>
  <entry TXID="2" TXSTATE="UPDATE">
     <key>KIWIFRUIT</key>
     <value>¥300</value>
  </entry>
</KVtable>
```

FIG.22

```xml
<KVlist>
    <entry>
        <key>GRAPE</key>
        <value>¥600</value>
        <less>
            <entry>
                <key>BISCUIT</key>
                <value>¥250</value>
                <less>
                    <entry>
                        <key>APPLE</key>
                        <value>¥400</value>
                    </entry>
                </less>
                <greater>
                    <entry>
                        <key>CHOCOLATE</key>
                        <value>¥200</value>
                    </entry>
                </greater>
            </entry>
        </less>
        <greater>
            <entry>
                <key>KIWIFRUIT</key>
                <value>¥300</value>
                <less>
                    <entry>
                        <key>ICECREAM</key>
                        <value>¥450</value>
                    </entry>
                </less>
                <greater>
                    <entry>
                        <key>LEMON</key>
                        <value>¥100</value>
                    </entry>
                </greater>
            </entry>
        </greater>
    </entry>
</KVlist>
```

FIG.23

```
[FILE001]
<KVlist>
   <entry>
      <key>KIWIFRUIT</key>
      <value>¥300</value>
      <less>
         <link>FILE002</link>
      </less>
      <greater>
        <entry>
           <key>ROSEMARY</key>
           <value>¥180</value>
        </entry>
        <less>
           <link>FILE003</link>
        </less>
        <greater>
           <link>FILE004</link>
        </greater>
      </greater>
   </entry>
</KVlist>
```

FIG.24

```
[FILE002]
<KVlist>
  <entry>
    <key>CHOCOLATE</key>
    <value>¥200</value>
    <less>
      <entry>
        <key>APPLE</key>
        <value>¥400</value>
        <greater>
          <entry>
            <key>BISCUIT</key>
            <value>¥250</value>
          </entry>
        </greater>
      </entry>
    </less>
    <greater>
      <entry>
        <key>GRAPE</key>
        <value>¥600</value>
        <greater>
          <entry>
            <key>ICECREAM</key>
            <value>¥450</value>
          </entry>
        </greater>
      </entry>
    </greater>
  </entry>
</KVlist>
```

FIG.25

```
[FILE003]
<KVlist>
   <entry>
      <key>MINT</key>
      <value>¥120</value>
      <less>
        <entry>
           <key>LEMON</key>
           <value>¥100</value>
        </entry>
      </less>
      <greater>
        <entry>
           <key>ORANGE</key>
           <value>¥210</value>
           <greater>
             <entry>
                <key>PINEAPPLE</key>
                <value>¥980</value>
             </entry>
           </greater>
        </entry>
      </greater>
   </entry>
</KVlist>
```

FIG.26

```
[FILE004]
<KVlist>
   <entry>
      <key>THYME</key>
      <value>¥200</value>
      <less>
        <entry>
           <key>SESAME</key>
           <value>¥130</value>
        </entry>
      </less>
      <greater>
        <entry>
           <key>VODKA</key>
           <value>¥1500</value>
           <greater>
             <entry>
                <key>YOGHURT</key>
                <value>¥85</value>
             </entry>
           </greater>
        </entry>
      </greater>
   </entry>
</KVlist>
```

FIG.28

| MEMBER FILES |
|---|
| FILE001,FILE002,FILE005 |
| FILE125,FILE126,FILE131,FILE132 |
| FILE256,FILE328,FILE549 |
| ⋮ |

FIG.29

```
[FILE003]
<KVlist>
   <entry>
      <key>MINT</key>
      <value>¥120</value>
      <less>
        <entry>
           <key>LEMON</key>
           <value>¥100</value>
        </entry>
      </less>
      <greater>
        <entry TXID="1" TXSTATE="UPDATE">
           <key>ORANGE</key>
           <value>¥250</value>
           <oldvalue>¥210</oldvalue>
           <greater>
             <entry>
                <key>PINEAPPLE</key>
                <value>¥980</value>
             </entry>
           </greater>
        </entry>
      </greater>
   </entry>
</KVlist>
```

FIG.30

```
[FILE004]
<KVlist>
   <entry>
      <key>THYME</key>
      <value>¥200</value>
      <less>
         <entry TXID="1" TXSTATE="UPDATE">
            <key>SESAME</key>
            <value>¥150</value>
            <oldvalue>¥130</oldvalue>
         </entry>
      </less>
      <greater>
         <entry TXID="2" TXSTATE="REMOVE">
            <key>VODKA</key>
            <value>¥1500</value>
            <greater>
               <entry>
                  <key>YOGHURT</key>
                  <value>¥85</value>
               </entry>
            </greater>
         </entry>
      </greater>
   </entry>
</KVlist>
```

FIG.31

```
[FILE003]
<KVlist>
   <entry>
      <key>MINT</key>
      <value>¥120</value>
      <less>
        <entry>
           <key>LEMON</key>
           <value>¥100</value>
        </entry>
      </less>
      <greater>
        <entry>
           <key>ORANGE</key>
           <value>¥250</value>
           <greater>
             <entry>
                <key>PINEAPPLE</key>
                <value>¥980</value>
             </entry>
           </greater>
        </entry>
      </greater>
   </entry>
</KVlist>
```

FIG.32

```
[FILE004]
<KVlist>
   <entry>
      <key>THYME</key>
      <value>¥200</value>
      <less>
        <entry>
           <key>SESAME</key>
           <value>¥150</value>
        </entry>
      </less>
      <greater>
        <entry TXID="2" TXSTATE="REMOVE">
          <key>VODKA</key>
          <value>¥1500</value>
          <greater>
            <entry>
               <key>YOGHURT</key>
               <value>¥85</value>
            </entry>
          </greater>
        </entry>
      </greater>
   </entry>
</KVlist>
```

FIG.33

```
[FILE004]
<KVlist>
   <entry>
      <key>THYME</key>
      <value>¥200</value>
      <less>
        <entry>
           <key>SESAME</key>
           <value>¥150</value>
        </entry>
      </less>
      <greater>
        <entry>
           <key>VODKA</key>
           <value>¥1500</value>
           <greater>
             <entry>
                <key>YOGHURT</key>
                <value>¥85</value>
             </entry>
           </greater>
        </entry>
      </greater>
   </entry>
</KVlist>
```

FIG.34

```
[FILE001]
<KVlist>
   <entry>
      <key>KIWIFRUIT</key>
      <value>¥300</value>
      <less>
         <entry TXID="3" TXSTATE="UPDATE">
            <key>DODO</key>
            <value>¥5000000</value>
         </entry>
         <less>
            <link>FILE002</link>
         </less>
         <greater>
            <link>FILE005</link>
         </greater>
      </less>
      <greater>
         <entry>
            <key>ROSEMARY</key>
            <value>¥180</value>
         </entry>
         <less>
            <link>FILE003</link>
         </less>
         <greater>
            <link>FILE004</link>
         </greater>
      </greater>
   </entry>
</KVlist>
```

FIG.35

```
[FILE002]
<KVlist>
   <entry>
      <key>BISCUIT</key>
      <value>¥250</value>
      <less>
         <entry>
            <key>APPLE</key>
            <value>¥400</value>
         </entry>
      </less>
      <greater>
         <entry>
            <key>CHOCOLATE</key>
            <value>¥200</value>
         </entry>
      </greater>
   </entry>
</KVlist>

[FILE003]
<KVlist>
   <entry>
      <key>MINT</key>
      <value>¥120</value>
      <less>
         <entry>
            <key>LEMON</key>
            <value>¥100</value>
         </entry>
      </less>
      <greater>
         <entry>
            <key>ORANGE</key>
            <value>¥250</value>
            <greater>
               <entry>
                  <key>PINEAPPLE</key>
                  <value>¥980</value>
               </entry>
            </greater>
         </entry>
      </greater>
   </entry>
</KVlist>
```

FIG. 36

```
[FILE004]
<KVlist>
   <entry>
      <key>THYME</key>
      <value>¥200</value>
      <less>
         <entry>
            <key>SESAME</key>
            <value>¥150</value>
         </entry>
      </less>
      <greater>
         <entry>
            <key>VODKA</key>
            <value>¥1500</value>
            <greater>
               <entry>
                  <key>YOGHURT</key>
                  <value>¥85</value>
               </entry>
            </greater>
         </entry>
      </greater>
   </entry>
</KVlist>

[FILE005]
<KVlist>
   <entry TXID="3" TXSTATE="UPDATE">
      <key>HOOPOE</key>
      <value>¥980000</value>
      <less>
         <entry>
            <key>GRAPE</key>
            <value>¥600</value>
         </entry>
      </less>
      <greater>
         <entry>
            <key>ICECREAM</key>
            <value>¥450</value>
         </entry>
      </greater>
   </entry>
</KVlist>
```

FIG.37

```
[FILE001]
<KVlist>
   <entry>
      <key>KIWIFRUIT</key>
      <value>¥300</value>
      <less>
        <entry>
           <key>DODO</key>
           <value>¥5000000</value>
        </entry>
        <less>
           <link>FILE002</link>
        </less>
        <greater>
           <link>FILE005</link>
        </greater>
      </less>
      <greater>
        <entry>
           <key>ROSEMARY</key>
           <value>¥180</value>
        </entry>
        <less>
           <link>FILE003</link>
        </less>
        <greater>
           <link>FILE004</link>
        </greater>
      </greater>
   </entry>
</KVlist>
```

FIG.38

```
[FILE002]
<KVlist>
   <entry>
      <key>BISCUIT</key>
      <value>¥250</value>
      <less>
         <entry>
            <key>APPLE</key>
            <value>¥400</value>
         </entry>
      </less>
      <greater>
         <entry>
            <key>CHOCOLATE</key>
            <value>¥200</value>
         </entry>
      </greater>
   </entry>
</KVlist>

[FILE005]
<KVlist>
   <entry>
      <key>HOOPOE</key>
      <value>¥980000</value>
      <less>
         <entry>
            <key>GRAPE</key>
            <value>¥600</value>
         </entry>
      </less>
      <greater>
         <entry>
            <key>ICECREAM</key>
            <value>¥450</value>
         </entry>
      </greater>
   </entry>
</KVlist>
```

FIG.39

```xml
<book>
   <chapter>
      <title>TOKYO</title>
      <author>MONJAYAKI</author>
   </chapter>
   <chapter>
      <title>NAGOYA</title>
      <author>EBIFURAI</author>
   </chapter>
   <chapter>
      <title>OSAKA</title>
      <author>TAKOYAKI</author>
   </chapter>
</book>
```

FIG.40

```
<book>
  <chapter>
    <title>TOKYO</title>
    <author>MONJAYAKI</author>
  </chapter>
  <chapter>
    <title>NAGOYA</title>
    <author TXID="1" TXSTATE="REMOVE">EBIFURAI</author>
    <author TXID="1" TXSTATE="ADD">MISOKATSU</author>
  </chapter>
  <chapter>
    <title>OSAKA</title>
    <author>TAKOYAKI</author>
  </chapter>
  <chapter TXID="2" TXSTATE="ADD">
    <title>HAKATA</title>
    <author>KARASHIMENTAIKO</author>
  </chapter>
</book>
```

FIG.41

```
<book>
   <chapter>
      <title>TOKYO</title>
      <author>MONJAYAKI</author>
   </chapter>
   <chapter>
      <title>NAGOYA</title>
      <author>MISOKATSU</author>
   </chapter>
   <chapter>
      <title>OSAKA</title>
      <author>TAKOYAKI</author>
   </chapter>
   <chapter TXID="2" TXSTATE="ADD">
      <title>HAKATA</title>
     <author>KARASHIMENTAIKO</author>
   </chapter>
</book>
```

FIG.42

```
<book>
   <chapter>
      <title>TOKYO</title>
      <author>MONJAYAKI</author>
   </chapter>
   <chapter>
      <title>NAGOYA</title>
      <author>MISOKATSU</author>
   </chapter>
   <chapter>
      <title>OSAKA</title>
      <author>TAKOYAKI</author>
   </chapter>
   <chapter>
      <title>HAKATA</title>
      <author>KARASHIMENTAIKO</author>
   </chapter>
</book>
```

TRANSACTION PROCESSING SYSTEM USING EFFICIENT FILE UPDATE PROCESSING AND RECOVERY PROCESSING

This application is a continuation of application 09/660,461 filed Sep. 12, 2000 now U.S. Pat. No. 6,519,614.

BACKGROUND OF THE INVENTION

1. Field of the Invention

The present invention relates to a transaction processing system and a transaction processing method in which a plurality of transactions make accesses to the same file in parallel.

2. Description of the Background Art

In general, in the transaction processing system, the execution of processing is managed in units of a flow of processing called transaction. For example, a necessary processing is executed and a processing result is returned in response to a processing request received from a terminal device or a network. Such a flow for executing a processing that is activated somehow will be referred to as a transaction.

The individual transaction makes updates of data to be recorded and managed by one or a plurality of files (or databases) in a process of its execution. The transaction processing system guarantees that such updates of one or a plurality of data are either atomically committed or aborted. Namely, the commit validates all the updates concurrently, whereas the abort discards all the updates and sets a state of the file back to the state before executing the transaction. In addition, the transaction system also guarantees that once the transaction is committed, the updates made by that transaction will never be cancelled.

There are various methods for realizing such a transaction processing system that are already well known, as can be found in J. Gray and A. Reuter: "Transaction Processing: Concepts and Techniques", Morgan Kaufmann Pulishers, Inc., for example.

A case that is difficult to handle in the transaction processing system is the case where a plurality of transactions make updates of data on one and the same file concurrently. No problem would arise if an update of one file is permitted only to one transaction at a time. However, in order to improve the performance by processing a plurality of transactions in parallel concurrently, it is necessary to enable updates of data to be recorded and managed at different portions of one and the same file concurrently. This problem also arises in the case of using databases rather than files. In the following, the case of using files will be described, but the case of using databases is similar.

In order to realize such a transaction processing system for carrying out the update processing in parallel, a scheme called WAL (Write Ahead Logging) has been widely used conventionally. In this scheme, when a plurality of transactions made updates with respect to a file read out to a buffer on a memory, the log file records which part of which file has been rewritten by which transaction and how it is rewritten. In addition, a timing is controlled such that the update made on the buffer will not be written back to the original file on a memory medium such as hard disk until it is guaranteed that the update information recorded in the log is written into a stable memory device (a hard disk, for example) so that it will not be lost, In the WAL scheme, all the update histories are recorded in the log so that when a system fault occurs, the files can be recovered to their correct states by using the log. Namely, when the system is re-activated after a fault occurred, the transaction processing system refers to the log and correctly reflects an update made by the committed transaction that is still not reflected in the file. Also, if there is an update made by the aborted transaction that is already written into the file, a processing for cancelling that update will be carried out. By such a recovery processing, it is possible to guarantee the atomicity, durability, isolation and consistency of transactions even when a fault occurs.

In the transaction processing system according to the conventional WAL scheme, when the transaction updates a file, the update content is written into the log first and then the file itself is updated, so that a complicated processing procedure will be required in order to manage the file sharing by a plurality of transactions. Moreover, the writing processing is required twice for one update, once for the log and once for the file itself. In addition, a complicated processing procedure is also required for a recovery processing to recover a consistent state of the file by using the log. Furthermore, the recovery processing must be carried out completely at a time of re-activation after a fault occurrence, so that the re-activation requires a considerable amount of time.

Another scheme for realizing the transaction processing system is the shadow page scheme. In this scheme, in the case of updating a file, a page with a file before the update written therein and a page with a file after the update written therein are provided on the hard disk, and the file management data are switched atomically at a time of the commit of the transaction. For this reason, it is possible to guarantee that the correct file always exists on the hard disk.

In the shadow page scheme, the file in the correct state always exists on the hard disk so that there is an advantage that the overhead of the recovery processing at a time of a fault occurrence is small. However, the shadow page scheme employs a basic operation for atomically switching pages recording two files, one before the commit and another after the commit of one transaction, so that in the case where a plurality of transactions wish to update one and the same file, it is necessary to serialize these transactions and make updates sequentially. In order to enable updates of different portions of one and the same file by a plurality of transactions in parallel as in the WAL scheme, it is insufficient to use the shadow page scheme alone, and it is necessary to employ some devise such as the data management using the log similarly as in the WAL scheme. For this reason, even though the shadow page scheme can be implemented easily, it becomes necessary to implement a complicated data management in addition.

Next, a conventional file system will be briefly described. FIG. 43 shows an example of a conventional transaction processing system. In the conventional transaction processing system, application programs 101 for processing transactions carry out data operations through a database management system 102. A file system 103 carries out operations and management of files recorded in a stable memory device such as hard disks 104 The database management system 102 manages data required by the application programs 101 by using files management by the file system 103. The database management system 102 also carries out a concurrency control during operations with respect to data shared by a plurality of application programs 102.

SUMMARY OF THE INVENTION

It is therefore an object of the present invention to provide a transaction processing method and a transaction processing system capable of easily and efficiently realizing the file update processing by a plurality of transactions operating in parallel as well as the recovery processing at a time of a fault occurrence.

According to one aspect of the present invention there is provided a transaction processing method, comprising the steps of: executing a plurality of transactions that carry out update processing with respect to one file read out onto a buffer region; and writing said one file into a stable memory device at a time of commit of one transaction among the plurality of transactions, said one file containing a content of committed updates made by said one transaction and a content of non-committed updates made by other non-committed transactions, and information for cancelling the non-committed updates.

According to another aspect of the present invention there is provided a transaction processing system, comprising: a reading unit configured to read out one file that is to be a transaction processing target from a stable memory device onto a buffer region; an update unit configured to update said one file by writing a content of updates with respect to said one file made by each one of a plurality of transactions and information for cancelling the updates, into said one file on the buffer region; and a writing unit configured to write said one file into the stable memory device at a time of a commit of one transaction among said plurality of transactions, said one file containing a content of committed updates made by said one transaction and a content of non-committed updates made by other non-committed transactions, and information for cancelling the non-committed updates.

According to another aspect of the present invention there is provided a computer usable medium having computer readable program codes embodied therein for causing a computer to function as a transaction processing system, the computer readable program codes include: a first computer readable program code for causing said computer to read out one file that is to be a transaction processing target from a stable memory device onto a buffer region; a second computer readable program code for causing said computer to update said one file by writing a content of updates with respect to said one file made by each one of a plurality of transactions and information for cancelling the updates, into said one file on the buffer region; and a third computer readable program code for causing said computer to write said one file into the stable memory device at a time of a commit of one transaction among said plurality of transactions, said one file containing a content of committed updates made by said one transaction and a content of non-committed updates made by other non-committed transactions, and information for cancelling the non-committed updates.

Other features and advantages of the present invention will become apparent from the following description taken in conjunction with the accompanying drawings.

BRIEF DESCRIPTION OF THE DRAWINGS

FIG. 2 is a diagram showing an example of an update management table used in the transaction processing system of FIG. 1.

FIG. 3 is a diagram showing an example of a transaction management table used in the transaction processing system of FIG. 1.

FIG. 4 is a diagram showing an example of a data file that can be used in the transaction processing system of FIG. 1.

FIG. 5 is a diagram showing a state of the data file of FIG. 4 after UPDATE (1, ICECREAM, ¥450) processing.

FIG. 6 is a diagram showing a state of the data file of FIG. 5 after UPDATE (3, APPLE, ¥500) processing.

FIG. 7 is a diagram showing a state of the data file of FIG. 6 after REMOVE (2, BISCUIT) processing.

FIG. 8 is a diagram showing a state of the data file of FIG. 7 after UPDATE (2, CHOCOLATE, ¥300) processing.

FIG. 9 is a diagram showing a state of the data file of FIG. 8 after REMOVE (1, GRAPE) processing.

FIG. 10 is a diagram showing a state of the data file of FIG. 9 after UPDATE (2, KIWIFRUIT, ¥300) processing.

FIG. 11 is a diagram showing a state of the data file of FIG. 10 after COMMIT (3) processing.

FIG. 12 is a diagram showing a state of the data file of FIG. 11 after COMMIT (1) processing.

FIG. 13 is a diagram showing a state of the data file of FIG. 12 after ABORT (2) processing.

FIG. 15 is a diagram showing a state of the data file of FIG. 4 after READ (4, CHOCOLATE) processing.

FIG. 21 is a diagram showing an example of a data file having information in a state of being updated by transactions, that can be used in the transaction processing system of FIG. 1.

FIG. 22 is a diagram showing an example of a data file using a binary tree structure for realizing faster search, that can be used in the transaction processing system of FIG. 1.

FIG. 23 is a diagram showing an example of one of a plurality of files recording one set of information, that can be used in the transaction processing system according to the present invention.

FIG. 24 is a diagram showing an example of another one of a plurality of files recording one set of information, that can be used in the transaction processing system according to the present invention.

FIG. 25 is a diagram showing an example of another one of a plurality of files recording one set of information, that can be used in the transaction processing system according to the present invention.

FIG. 26 is a diagram showing an example of another one of a plurality of files recording one set of information, that can be used in the transaction processing system according to the present invention.

FIG. 28 is a diagram showing an example of an update group table used in the transaction processing system of FIG. 27.

FIG. 29 is a diagram showing a state of the data file of FIG. 25 after updates by transactions (1) and (2).

FIG. 30 is a diagram showing a state of the data file of FIG. 26 after updates by transactions (1) and (2).

FIG. 31 is a diagram showing a state of the data file of FIG. 29 after commit of transaction (1).

FIG. 32 is a diagram showing a state of the data file of FIG. 30 after commit of transaction (1).

FIG. 33 is a diagram showing a state of the data file of FIG. 32 after abort of transaction (2).

FIG. 34 is a diagram showing a state of one part of the data files of FIGS. 23, 24, 25, and 26 after updates by transaction (3).

FIG. 35 is a diagram showing a state of another part of the data files of FIGS. 23, 24, 25, and 26 after updates by transaction (3).

FIG. 36 is a diagram showing a state of another part of the data files of FIGS. 23, 24, 25, and 26 after updates by transaction (3).

FIG. 37 is a diagram showing a state of one data file to be written back from the data files of FIGS. 34, 35 and 36 after commit of transaction (3).

FIG. 38 is a diagram showing a state of other data files to be written back from the data files of FIGS. 34, 35 and 36 after commit of transaction (3).

FIG. 39 is a diagram showing an example of a general XML document that can be used in the transaction processing system of FIG. 1.

FIG. 40 is a diagram showing a state of the XML document of FIG. 39 after updates by transactions (1) and (2).

FIG. 41 is a diagram showing a state of the XML document of FIG. 40 after commit of transaction (1).

FIG. 42 is a diagram showing a state of the XML document of FIG. 41 after commit of transaction (2).

DETAILED DESCRIPTION OF THE PREFERRED EMBODIMENTS

Referring now to FIG. 1 to FIG. 42, one embodiment of a transaction processing system according to the present invention will be described in detail.

Figure 1:
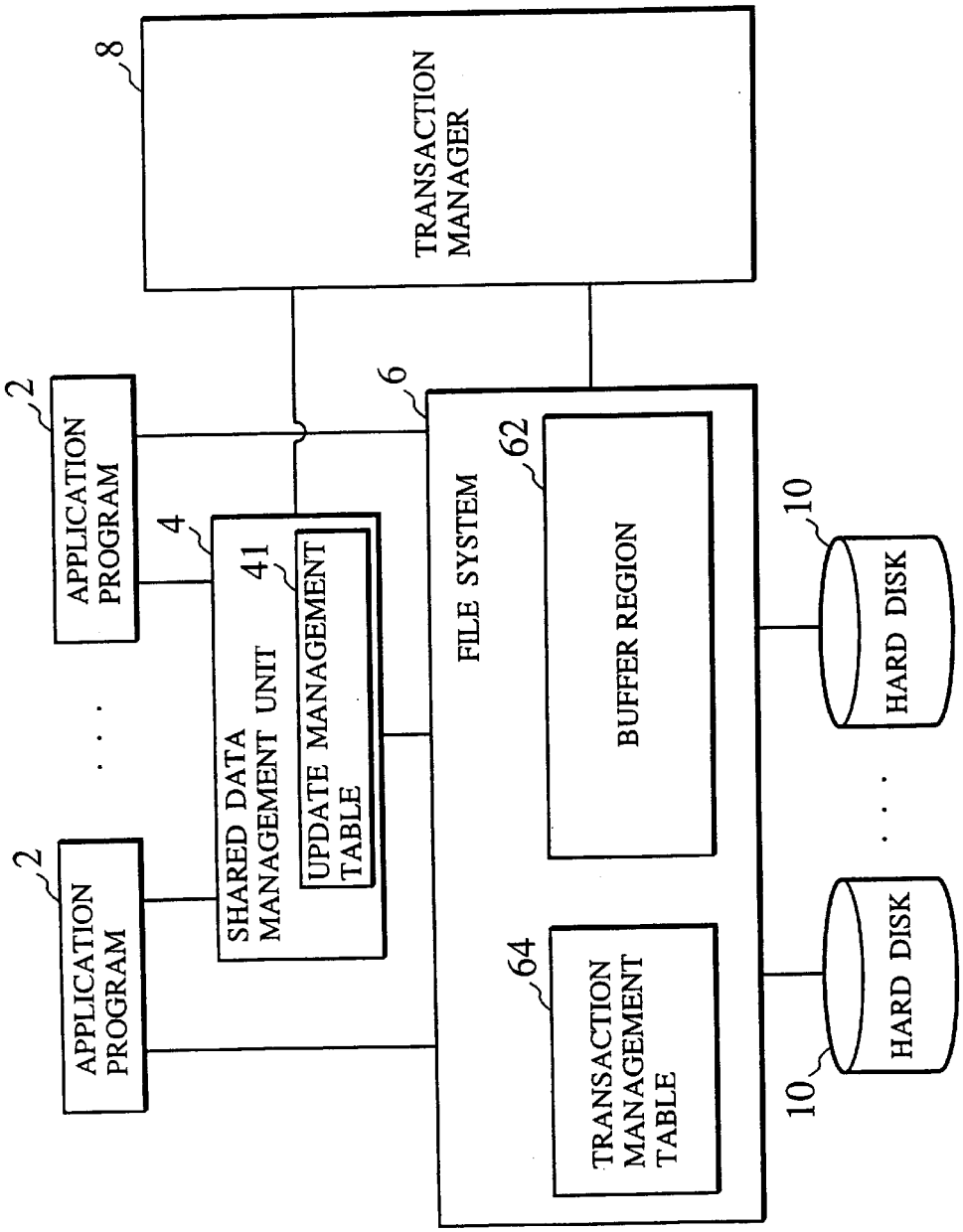
FIG. 1 is a block diagram showing one exemplary configuration of a transaction processing system according to one embodiment of the present invention.

FIG. 1 shows an exemplary configuration of a transaction processing system according to one embodiment of the present invention.

Note that, in the following description of this embodiment, a hard disk will be used as a stable memory device but it is of course also possible to use any other suitable memory device as a stable memory device. Also, in the following description of this embodiment, transactions will be generated by application programs but it should be apparent that the other cases where transactions are generated by things other than application programs are similar.

In the transaction processing system of this embodiment, as shown in FIG. 1, operations of files shared among a plurality of application programs 2 for executing transactions are carried out through a shared data management unit 4, while operations of non-shared files are carried out by directly commanding a file system 6 from the application programs 2.

A transaction manager 8 carries out management of transactions to be processed by each application program 2. The application program 2 obtains a transaction identifier allocated by the transaction manager 8 at a time of start processing the transaction. Thereafter, the transaction that is making an update of a file will be notified by presenting the transaction identifier, in the case of commanding operations to the shared data management unit 4 or the file system 6 in a process of processing the transaction. When the application program 2 notifies the completion of the transaction processing to the transaction manager 8, the transaction manager 8 commands the shared data management unit 4 and the file system 6 to either commit by writing a result of the file update made by the transaction identified by the transaction identifier, or abort by discarding the update result.

Note that it is also possible to use a configuration without the transaction manager 8 in which the application program 2 itself generates information corresponding to the transaction identifier and commands commit or abort, but in the following, the case of using the transaction manager 8 will be described.

The shared data management unit 4 realizes updates of different portions of one and the same file by a plurality of transactions. The shared data management unit 4 is managing which file is updated by which transaction (through this shared data management unit 4), using an update management table 41. FIG. 2 shows an example of the update management table 41. The update management table 41 records a correspondence between a file name and a list of transaction identifiers of the transactions that are updating that file. FIG. 2 indicates that a file with the file name of F0102 is currently updated by three transactions having the transaction identifiers of "36", "21" and "5", for example.

The file system 6 is a unit for realizing file operations by the transactions. The file system 6 has a buffer management unit (not shown) for managing a buffer region 62 and a transaction management table 61. In the case of reading or updating a file recorded in a hard disk 10, this file is read out to the buffer region 62 and then read or updated on the buffer region 62. In the case of creating a new file, a file is created on the buffer region 62 first. A file that is updated or created on the buffer region 62 is written into the hard disk 10 at a time of the commit of the transaction. The transaction management table 61 is managing which transaction is updating which file.

FIG. 3 shows an example of the transaction management table 61. The transaction management table 61 records a correspondence between the transaction identifier and a list of files that are currently updated by that transaction. FIG. 3 indicates that a transaction with the transaction identifier of "3" is currently updating only a file F9268, while a transaction with the transaction identifier of "5" is currently updating two files F0100 and F9264, for example. The last entry in the transaction management table 61 is managing updates of files that do not belong to any transaction.

In the transaction management table 61 shown in FIG. 3, the entry of a transaction "NOTX" at the last row corresponds to this. In this example, it is indicated that files F0102, F2156, F3624, F5497 and F7531 are being updated without having any relation with any transaction, rather than being updated as a part of a specific transaction. As will be described below, files that are being updated through the shared data management unit 4 will be updated without belonging to any transaction, so that these files will be recorded in this entry. Note that the transactions that are updating files recorded in this entry can be ascertained by referring to the update management table 41 of the shared data management unit 4.

In the following, the exemplary case of using information in an XML document format as an example of data, where the transaction processing system updates files in which information is recorded in an XML document format through the shared data management unit 4, will be described.

Note that details concerning XML are disclosed in "Extensible Markup Language (XML) 1.0", (W3C Recommendation Feb. 10, 1998).

In this case, the transaction processing system records and manages a set of pairs formed by "key" and a corresponding "value" in a file of the XML document format. This document can be used as a general database in which a value can be searched by specifying a key.

FIG. 4 shows an example of such a document. In this exemplary XML document, a "key" is maintained at a portion enclosed by tags <key> and </key>, a "value" is maintained at a portion enclosed by tags <value> and </value>, an entry in which a pair of "key" and "value" is enclosed by tags <entry> and </entry> is formed, and a plurality of such entries are enclosed by outermost tags <KVtable> and </KVtable>. In practice, the XML document also has a prologue section that begins with <?xml version="1.0"?> at its top portion, but it is omitted here. Note that, in the XML language, a portion enclosed by a start tag such as <key> and a corresponding end tag such as </key> will be referred to as an element.

In the XML document shown in FIG. 4, a key "APPLE" has a corresponding value "¥400", a key "BISCUIT" has a corresponding value "¥250", a key "CHOCOLATE" has a corresponding value "¥200", and a key "GRAPE" has a corresponding value "¥600".

Here, the application program 2 and the transaction manager 8 that execute transactions with respect to this XML document file can carry out five types of operations including "READ (txid, key)", "UPDATE (txid, key, value)", "REMOVE (txid, key)", "COMMIT (txid)" and "ABORT (txid)", through the shared data management unit. In this embodiment, READ, UPDATE, and REMOVE will be commanded by the application program 2, while COMMIT and ABORT will be commanded by the transaction manager 8. Note that, as already mentioned above, it is possible for the application program 2 to command COMMIT and ABORT as well in the case of not using the transaction manager 8.

READ (txid, key) is an operation in which a transaction having an transaction identifier specified by "txid" reads out a value of an entry specified by "key".

UPDATE (txid, key, value) is an operation in which a transaction having a transaction identifier specified by "txid" updates a value of an entry specified by "key" to a value specified by "value". When an entry specified by "key" does not exist, a new entry will be created.

REMOVE (txid, key) is an operation in which a transaction having a transaction identifier specified by "txid" deletes an entry specified by "key".

COMMIT (txid) is an operation in which a file content update made by a transaction having a transaction identifier specified by "txid" is made permanent by writing it back to a file on a disk.

ABORT (txid) is an operation in which a file content update made by a transaction having a transaction identifier specified by "txid" is totally cancelled.

Among these five operations, READ is an operation that does not update the file content while UPDATE and REMOVE are operations that update the file content, and COMMIT and ABORT are operations for setting a processing result of the transaction in a committed state, i.e., a correctly completed state, or in a state before the processing start by cancelling the processing result.

Now the operation of the transaction processing system of this embodiment will be described for an exemplary case where three transactions (a transaction (1) with txid=1, a transaction (2) with txid=2, and a transaction (3) with txid=3) make accesses to the XML document of FIG. 4 in parallel as follows.

[1] UPDATE (1, ICECREAM, ¥450)
[2] UPDATE (3, APPLE, ¥500)
[3] REMOVE (2, BISCUIT)
[4] UPDATE (2, CHOCOLATE, ¥300)
[5] REMOVE (1, GRAPE)
[6] UPDATE (2, KIWIFRUIT, ¥300)
[7] COMMIT (3)
[8] COMMIT (1)
[9] ABORT (2)

In the case where this transaction processing system updates the file of FIG. 4, the file system 6 that is commanded from the shared data management unit 4 reads out the content of a file in the hard disk 10 to the buffer region 62 first. Until the transaction is committed, the update of the file will be made only with respect to a copy in the buffer region 62 and will not be written back to the hard disk 10.

[1] First, by UPDATE (1, ICECREAM, ¥450), the transaction (1) adds a key "ICECREAM" and sets its value as "¥450". At this point, if the file is still not in the buffer region 62, the file will be read out to the buffer region 62. After that, the data in the buffer region 62 is changed as shown in FIG. 5. Here, a new entry with a key "ICECREAM" is added and its value is set as "¥450". In addition, in order to indicate that this entry is currently updated by the transaction (1), two attributes TXID and TXSTATE are recorded as attributes of the tag <entry>. The attribute TXID records a transaction identifier of a transaction that made the update while the attribute TXSTATE records a type of update, and this information will be used at a time of COMMIT or ABORT processing. Here, the transaction identifier "1" is set as a value of the TXID attribute, and "UPDATE" indicating that it is currently updated is set as a value of the TXSTATE attribute.

[2] Next, by UPDATE (3, APPLE, ¥500), the transaction (3) updates a value of a key "APPLE" to "¥500". At this point, the data in the buffer region is changed as shown in FIG. 6. Here, the <value> tags of the entry with the key "APPLE" is retained by changing it to <oldvalue> tags, and a new element in which a new value "¥500" is enclosed by <value> tags is created and added to the entry. In addition, the transaction identifier "3" is set as a value of the TXID attribute and "UPDATE" indicating that it is currently updated is set as a value of the TXSTATE attribute.

[3] Next, by REMOVE (2, BISCUIT), the transaction (2) deletes an entry with a key "BISCUIT". At this point, the data in the buffer region 62 is changed as shown in FIG. 7. Here, the transaction identifier "2" is set as a value of the TXID attribute and "REMOVE" indicating that it is deleted is set as a value of the TXSTATE attribute in an entry with the key "BISCUIT".

[4] Next, by UPDATE (2, CHOCOLATE, ¥300), the transaction (2) updates a value of a key "CHOCOLATE" to "¥300" and carries out the processing similar to the above such that the data in the buffer region 62 becomes as shown in FIG. 8.

[5] Next, by REMOVE (1, GRAPE), the transaction (1) deletes an entry with a key "GRAPE" and carries out the processing similar to the above such that the data in the buffer region 62 becomes as shown in FIG. 9.

[6] Next, by UPDATE (2, KIWIFRUIT, ¥300), the transaction (2) adds an entry with a key "KIWIFRUIT", sets its value as "¥300", and carries out the processing similar to the above such that the data in the buffer region 62 becomes as shown in FIG. 10.

[7] Next, by COMMIT (3), the commit processing for the transaction (3) is activated.

Now, the commit processing in the case where a plurality of transactions are updating one and the same file as in the above will be described.

Suppose that the commit processing for the transaction (3) is activated by COMMIT (3) in a state where the data of the file is updated on the buffer region 62 as shown in FIG. 10. At this point, the update made by the transaction (3) is changed from a temporary state in which the element has TXID and TXSTATE and includes <oldvalue> tags to a correctly updated state that can be written back to the hard disk 10 by deleting these TXID, TXSTATE and <oldvalue> tags.

When the data of the file that reflects the update made by the transaction (3) is produced in this way, this is written back to replace the original file in the hard disk 10. At this point, in this embodiment, the data in the state of being currently updated by the transaction (1) and the transaction (2) can be written back to the hard disk 10 in that state. This is because, as will be described below, information necessary in cancelling the update is attached to data in the state of being currently updated, so that it is possible to carry out a processing for cancelling the update when this data is read out next.

[8] Next, by COMMIT (1), the commit processing for the transaction (1) is activated. At this point, the update made by the transaction (1) is reflected into the data as shown in FIG. 12, and this is written back to the hard disk 10.

[9] Next, by ABORT (2), the transaction (2) is aborted. At this point, the update made by the transaction (2) is cancelled from the data of the file in the buffer region 62 as shown in FIG. 13.

In the following, the processing procedure for each operation described in the above example will be described in detail.

First, the processing procedure for READ will be described.

The operation of READ is simple as it merely reads out a value of an entry corresponding to the specified key. However, there are two methods for implementing READ depending on how the system is used. What is common to both methods is that the value can be reads out if it is not currently updated by the other transaction. However, the difference between these two methods arises in relation to whether an entry read out by one transaction can be updated by the other transaction before that one transaction is completed or not. Namely, one method adopts an interpretation that this can be done so that no exclusive control is used for READ. Another method adopts an interpretation that this cannot be done, so that the exclusive control according to the well known READ/WRITE lock semantics is used. More specifically, READ and the update by the same transaction are compatible, but READ and the update by different transactions are incompatible, while READs by different transactions are compatible.

The former case of using no exclusive control can be effectively viewed as a special case of the latter method using the exclusive control obtained by omitting the control with respect to READ, so that the processing procedure for the latter method will be described here.

Figure 14:
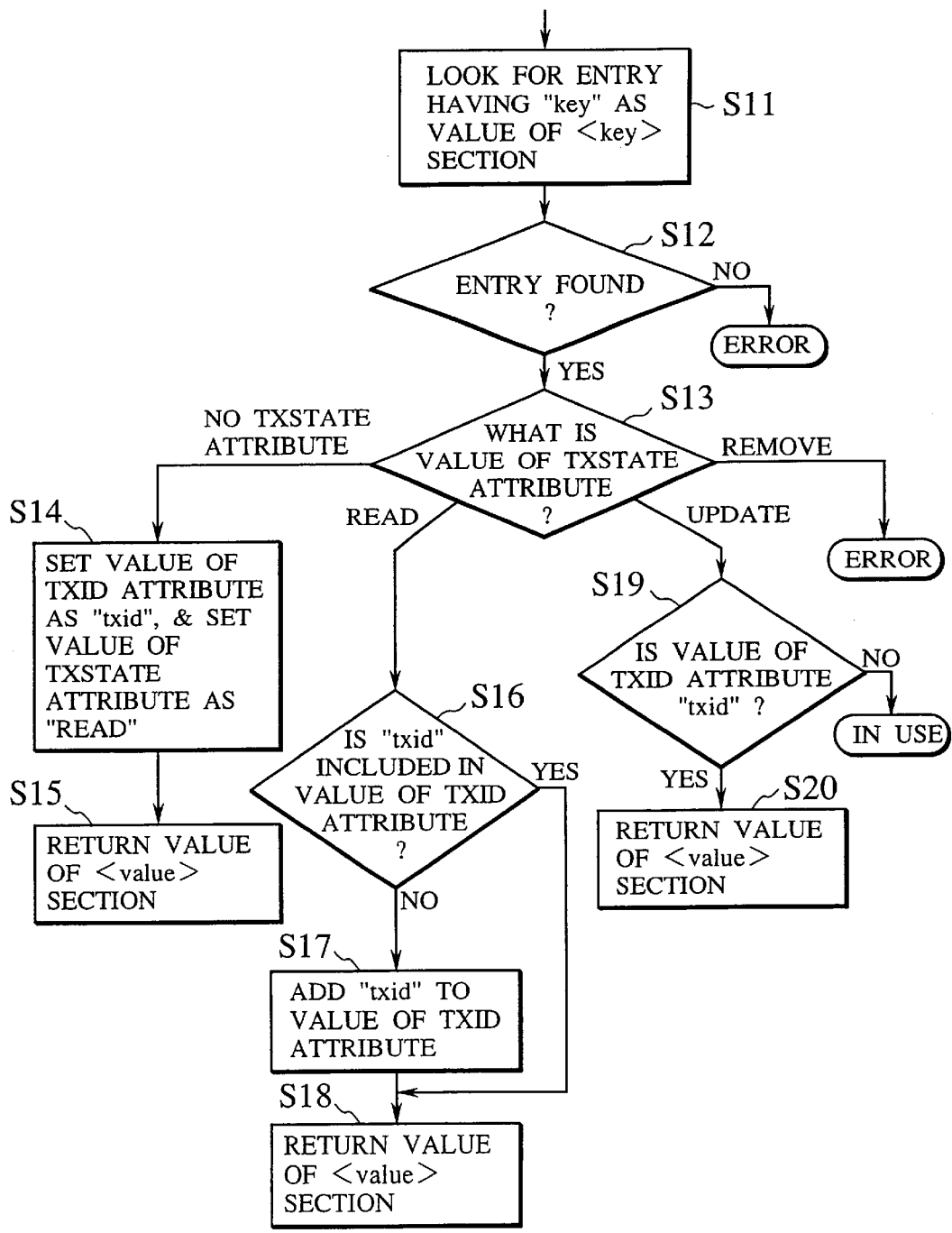
FIG. 14 is a flow chart showing an exemplary processing procedure for READ (txid, key) in the transaction processing system of FIG. 1.

FIG. 14 shows an exemplary processing procedure for READ (txid, key).

First, an entry having a value of the key equal to the specified "key" is searched (step S11).

If the entry is found (step S12 YES), whether the TXSTATE attribute is attached to that entry or not is checked, and if the TXSTATE attribute is attached, which one of "READ", "UPDATE" and "REMOVE" is the value of that TXSTATE attribute is checked (step S13)

In the case where the TXSTATE attribute is not attached, it implies that no one is accessing to that entry so that the TXID attribute and the TXSTATE attribute are attached to that entry and the value of the TXID attribute is set as, "txid" while the value of the TXSTATE attribute is set as "READ" (step S14), and the value of the <value> section is returned as a result (step S15).

In the case where the value of the TXSTATE attribute is "READ", if "txid" is not included in the value of the TXID attribute yet (step S16 NO), "txid" is added to the value of the TXID attribute (step S17), and the value of the <value> section is returned as a result (step S18).

In the case where the value of the TXSTATE attribute is "UPDATE", whether the value of the TXID attribute is "txid" or not is checked (step S19), and the entry can be read if it is updated by the same transaction (step S19 YES) so that the value of the <value> section is returned as a result (step S20). Otherwise (step S19 NO), it is notified that the entry cannot be read as it is currently in use by the other transaction.

In the case where the value of the TXSTATE attribute is "REMOVE", it is an attempt to read something that does not exist so that an error is indicated.

If the entry cannot be found (step S12 NO), and an error is indicated.

FIG. 15 shows a state of the data on the buffer region 62 immediately after the transaction (4) has read out the value of the key "CHOCOLATE" as a result of READ (4, CHOCOLATE) with respect to the file data in the state shown in FIG. 4.

Normally, the value of the TXID attribute has one transaction identifier, but in the case where the value of the TXSTATE attribute is "READ", the value of the TXID attribute can have a list of transaction identifiers. This is because a plurality of transactions can read it concurrently. For example, when the transactions with the transaction identifiers "1", "4" and "5" are reading it, the value of its TXID attribute is given by a list in a form of "1 4 5".

Next, the processing procedure for UPDATE will be described.

Figure 16:
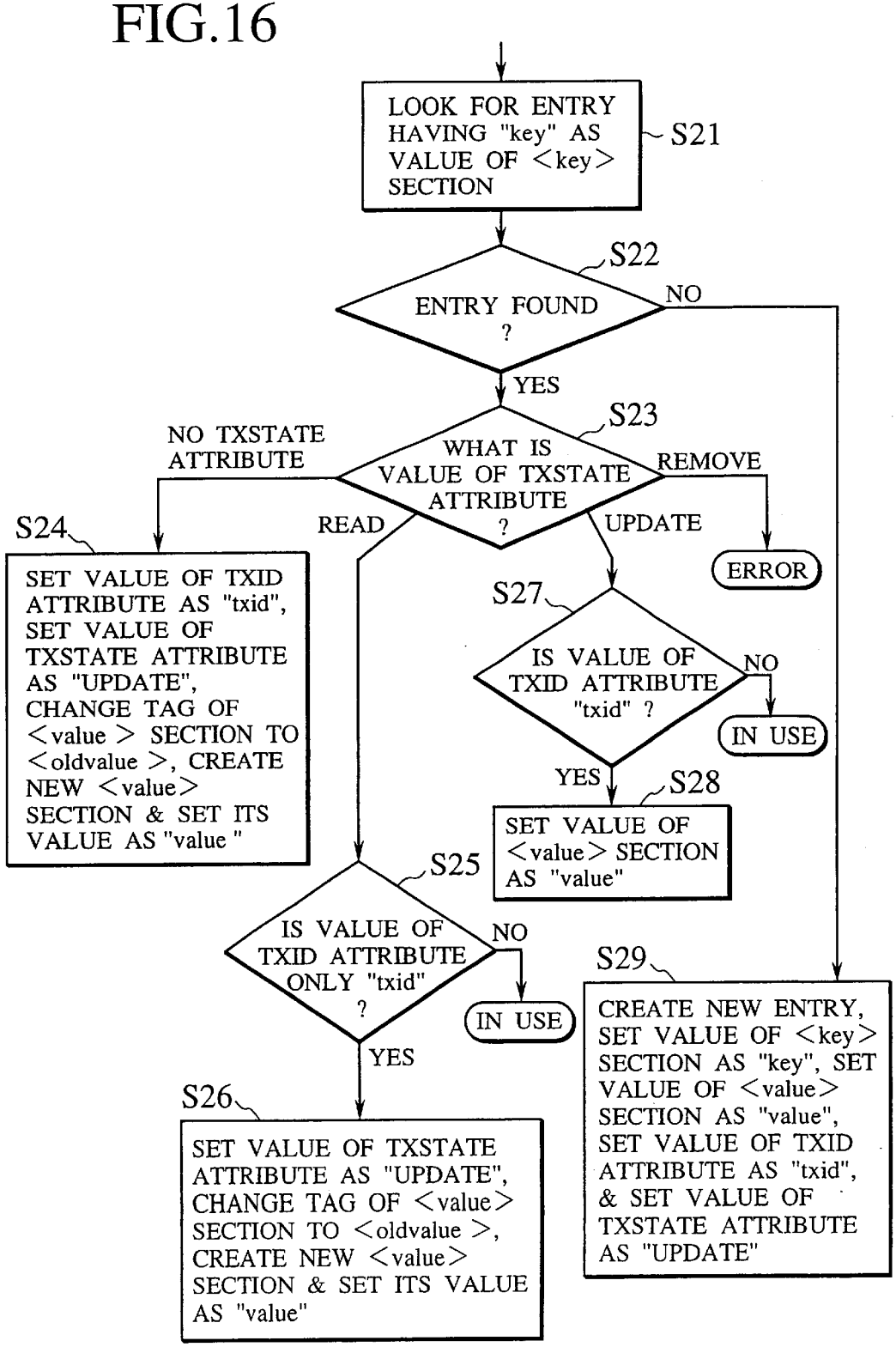
FIG. 16 is a flow chart showing an exemplary processing procedure for UPDATE (txid, key, value) in the transaction processing system of FIG. 1.

FIG. 16 shows an exemplary processing procedure for UPDATE (txid, key, value).

First, an entry having a value of the key equal to the specified "key" is searched (step S21).

If the entry is found (step S22 YES), whether the TXSTATE attribute is attached to that entry or not is checked, and if the TXSTATE attribute is attached, which one of "READ", "UPDATE" and "REMOVE" is the value of that TXSTATE attribute is checked (step S23)

In the case where the TXSTATE attribute is not attached, it implies that no one is accessing to that entry so that the TXID attribute and the TXSTATE attribute are attached to that entry and the value of the TXID attribute is set as "txid"

while the value of the TXSTATE attribute is set as "UPDATE", and the tag name of the current <value> section is changed to <oldvalue> while a new <value> section is created and its value is set as "value" specified by the third argument of UPDATE (step S24).

In the case where the value of the TXSTATE attribute is "READ", it is possible to update this entry only when the same transaction alone is reading so that whether the value of the TXID attribute is only "txid" or not is checked (step S25). If so, the value of the TXSTATE attribute is changed to "UPDATE", the tag name of the current <value> section is changed to <oldvalue>, a new <value> section is created and its value is set as "value" specified by the third argument of UPDATE (step S26). If the other transaction is reading, UPDATE cannot be executed so that it is notified that this entry is currently in use by the other transaction.

In the case where the value of the TXSTATE attribute is "UPDATE", whether the value of the TXID attribute is "txid" or not is checked (step S27). If so, it is the entry updated by the same transaction so that the value of the <value> section is changed to "value" specified by the third argument of UPDATE (step S28). If the other transaction is updating (step S27 NO), UPDATE cannot be executed so that it is notified that this entry is currently in use by the other transaction.

In the case where the value of the TXSTATE attribute is "REMOVE", it is an attempt to update something that does not exist so that an error is indicated.

If the entry having a value of the key equal to the specified "key" cannot be found (step S22 NO), a new entry is created and its values of the <key> section and the <value> section are set as "key" and "value" specified by the second and third arguments of UPDATE respectively, while the value of the TXID attribute is set as "txid" and the value of the TXSTATE attribute is set as "UPDATE" (step S29).

Next, the processing procedure for REMOVE will be described.

Figure 17:
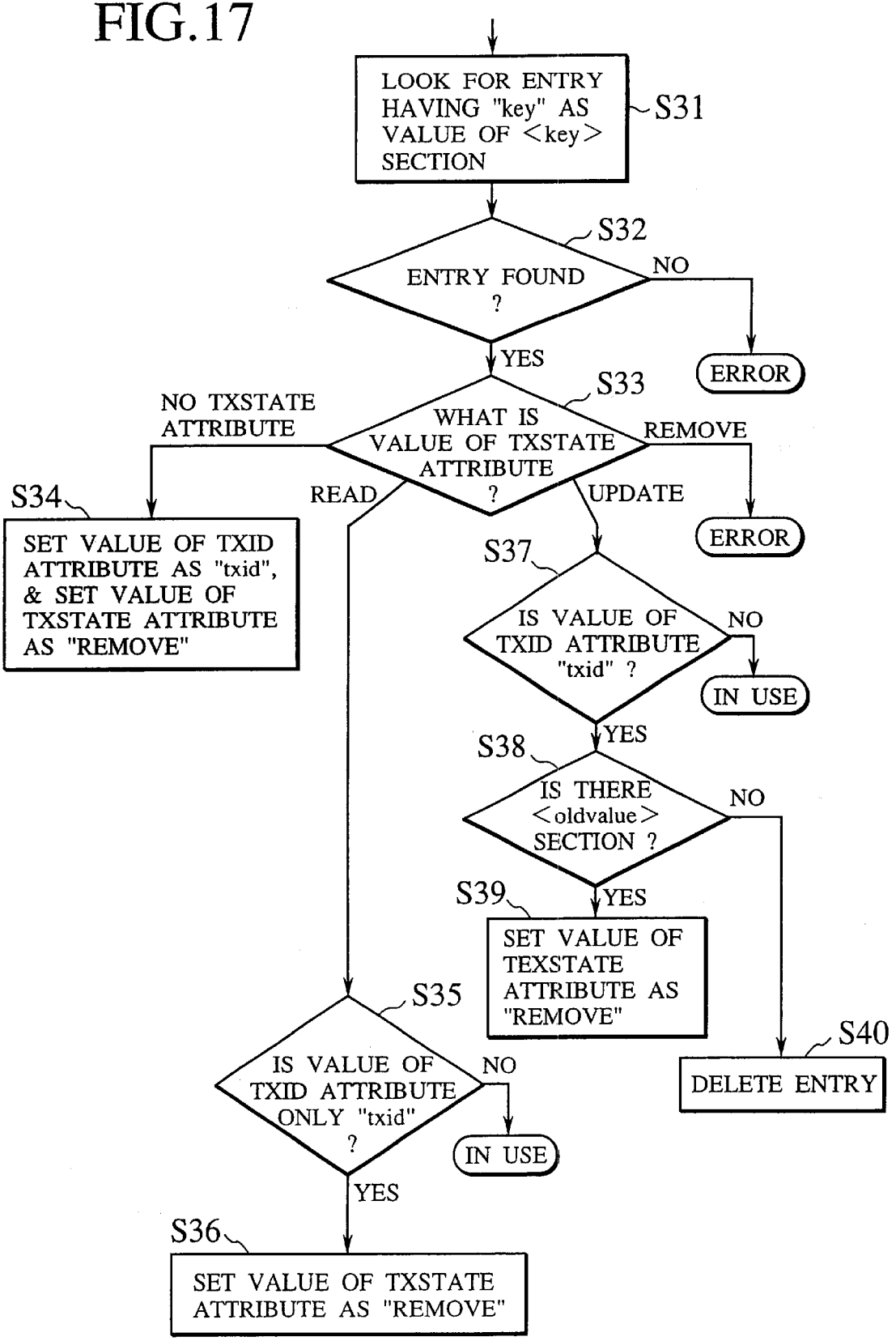
FIG. 17 is a flow chart showing an exemplary processing procedure for REMOVE (txid, key) in the transaction processing system of FIG. 1.

FIG. 17 shows an exemplary processing procedure for REMOVE (txid, key).

First, an entry having a value of the key equal to the specified "key" is searched (step S31).

If the entry is found (step S32 YES), whether the TXSTATE attribute is attached to that entry or not is checked, and if the TXSTATE attribute is attached, which one of "READ", "UPDATE" and "REMOVE" is the value of that TXSTATE attribute is checked (step S33)

In the case where the TXSTATE attribute is not attached, it implies that no one is accessing to that entry so that the TXID attribute and the TXSTATE attribute are attached to that entry and the value of the TXID attribute is set as "txid" while the value of the TXSTATE attribute is set as "REMOVE" (step S34).

In the case where the value of the TXSTATE attribute is "READ", it is possible to delete this entry only when the same transaction alone is reading so that whether the value of the TXID attribute is only "txid" or not is checked (step S35). If so, the value of the TXSTATE attribute is changed to "REMOVE" (step S36). If the other transaction is reading, REMOVE cannot be executed so that it is notified that this entry is currently in use by the other transaction.

In the case where the value of the TXSTATE attribute is "UPDATE", whether the value of the TXID attribute is "txid" or not is checked (step S37). If so, it is the entry updated by the same transaction so that REMOVE can be executed. At this point, whether this is an entry newly created by this transaction or an entry that has been existing from before can be ascertained by whether there is the <oldvalue> section or not. In there is no <oldvalue> section (step S38 NO), it is an entry created by this transaction so that this entry can be deleted immediately (step S40). Otherwise (step S38 YES), the value of the TXSTATE attribute is changed to "REMOVE" (step S39). If the other transaction is updating (step S37 NO), REMOVE cannot be executed so that it is notified that this entry is currently in use by the other transaction.

In the case where the value of the TXSTATE attribute is "REMOVE", it is an attempt to delete something that does not exist so that an error is indicated.

If the entry cannot be found (step S32 NO), an error is indicated.

Next, the processing procedure for COMMIT will be described.

Figure 18:
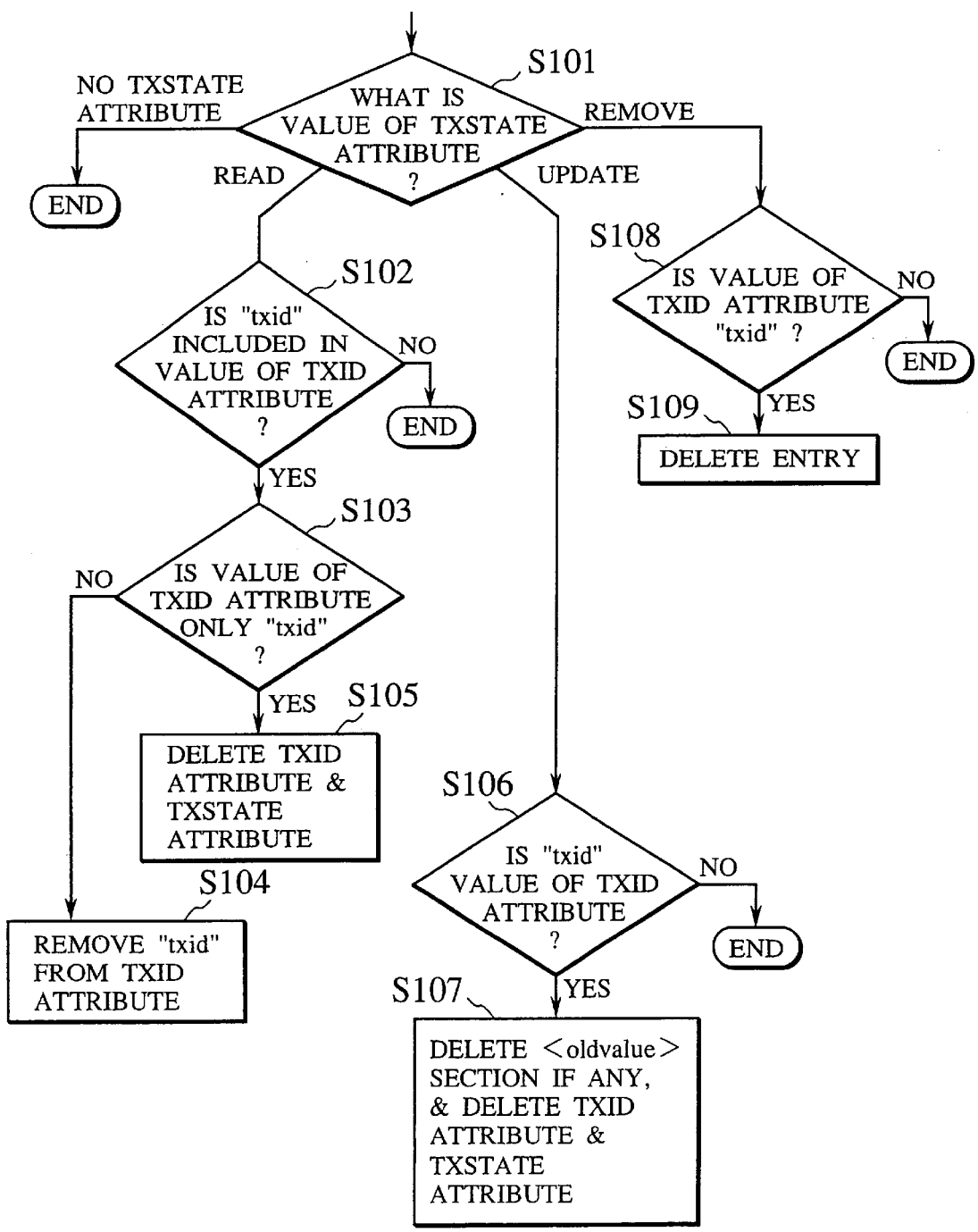
FIG. 18 is a flow chart showing an exemplary processing procedure for COMMIT (txid) in the transaction processing system of FIG. 1.

FIG. 18 shows an exemplary processing procedure for COMMIT (txid).

In the COMMIT processing, every entry in the file is processed by the procedure of FIG. 18.

First, the value of the TXSTATE attribute of that entry is checked (step S101).

If there is no TXSTATE attribute, no operation is necessary because no transaction has accessed this entry.

In the case where the value of the TXSTATE attribute is "READ", if "txid" is contained in the value of the TXID attribute (step S102 YES) and if the other transaction identifiers are also contained so that "txid" is not the only value of the TXID attribute (step S103 NO), "txid" is removed from the TXID attribute (step S104). If "txid" is the only value of the TXID attribute (step S103 YES), the TXID attribute and the TXSTATE attribute are deleted (step S105).

In the case where the value of the TXSTATE attribute is "UPDATE", whether the value of the TXID attribute is "txid" or not is checked (step S106). If so, the <oldvalue> section, the TXID attribute and the TXSTATE attribute are deleted and this update is validated (step S107).

In the case where the value of the TXSTATE attribute is "REMOVE", whether the value of the TXID attribute is "txid" or not is checked (step S108). If so, this entry is deleted (step S109).

When the above processing is completed for all the entries, the data on the buffer region 62 at that moment are written back to the hard disk 10 so as to update the file.

Note that, at the end of the COMMIT processing, the shared data management unit 4 commands the file system 6 to write the file updated on the buffer region 62 into the hard disk 10. At this point, the file writing must be done atomically in synchronization with the other files updated by the transaction to be committed. Namely, there is a possibility that the application program 2 that executes the transaction has made updates on a plurality of files by directly commanding the file system 6 without using the shared data management unit 4, and there is also a possibility that a plurality of files are updated through the shared data management unit 4 (see FIG. 2 and FIG. 3). In order to commit this transaction atomically, it is necessary to commit all the updates on there plurality of files completely. In the transaction processing system of this embodiment, a list of files updated by direct commands from the application program 2 is managed for each transaction, so that the files updated by the same transaction can be collectively and atomically written back to the hard disk 10 using that information.

However, the files operated through the shared data management unit 4 are managed in the file system 6 as files that are not related to any transaction. A timing of the commit of which transaction should be used as a timing for writing these files back is judged by the shared data management unit 4 at a time of the COMMIT processing.

To this end, the file system 6 is provided with a function for commanding the write back of files opened and updated by the shared data management unit 4 without any relation to any transaction, into the hard disk 10 atomically in synchronization with a timing of the commit of a specific transaction. The shared data management unit 4 that carries out the COMMIT processing reflects the update made by the transaction of the specified transaction identifier into the file, and then commands the file system 6 to write this file back into the hard disk 10 in synchronization with the transaction of the specified transaction identifier. The file system 6 writes back the file specified in this way, atomically into the hard disk 10 at a time of the commit of the transaction of the specified transaction identifier, concurrently with the files updated by that transactions as indicated in the transaction management table 61.

Note however that the information of the files updated by the application program 2 that executes the transaction by directly commanding the file system 6 (such as entries of the transaction management table 61 and images of the files in the buffer region 62) will becomes unnecessary after the commit processing of the file system 6 is finished. On the other hand, the files updated by the shared data management unit 4 without any relation to any specific transaction will continue to be updated by the other transactions even after that, so that these files will continue to be used by the shared data management unit 4 in the state of having no relation to any transaction. For this reason, the file system 6 will continue to maintain the information regarding these files.

Next, the processing procedure for ABORT will be described.

Figure 19:
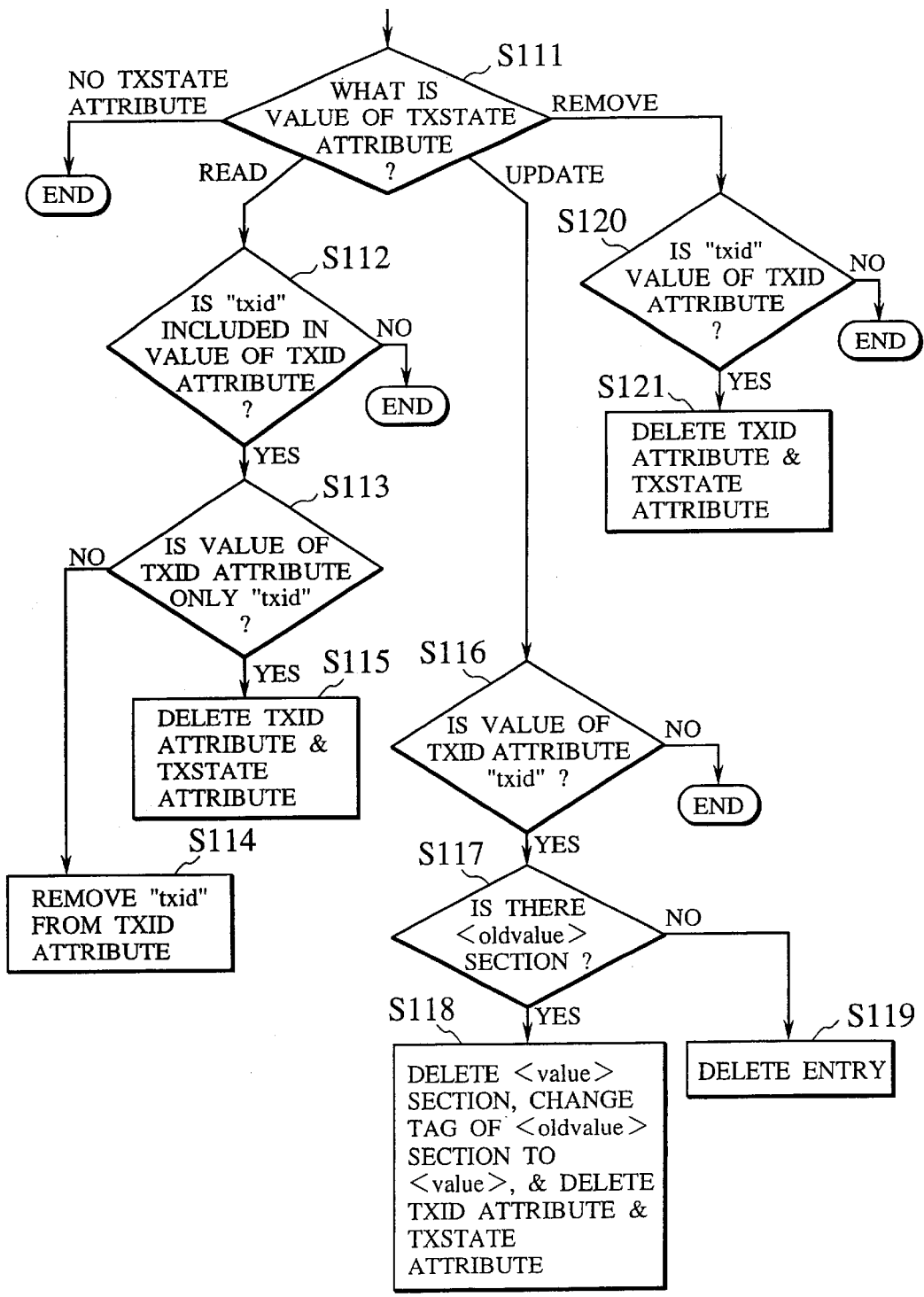
FIG. 19 is a flow chart showing an exemplary processing procedure for ABORT (txid) in the transaction processing system of FIG. 1.

FIG. 19 shows an exemplary processing procedure for ABORT (txid).

In the ABORT processing, every entry in the file is processed by the procedure of FIG. 19.

First, the value of the TXSTATE attribute of that entry is checked (step S111).

If there is no TXSTATE attribute, no operation is necessary because no transaction has accessed this entry.

In the case where the value of the TXSTATE attribute is "READ", if "txid" is contained in the value of the TXID attribute (step S112 YES) and if the other transaction identifiers are also contained so that "txid" is not the only value of the TXID attribute (step S113 NO), "txid" is removed from the TXID attribute (step S114). If "txid" is the only value of the TXID attribute (step S113 YES), the TXID attribute and the TXSTATE attribute are deleted (step S115).

In the case where the value of the TXSTATE attribute is "UPDATE", whether the value of the TXID attribute is "txid" or not is checked (step S116). If so, the operation to cancel UPDATE of that entry is carried out. At this point, if there is an <oldvalue> section in that entry (step S117 YES), the current <value> section is deleted and the tag name of the <oldvalue> section is changed to <value> so as to have the value before the update back, while the TXID attribute and the TXSTATE attribute are deleted (step S118). If there is no <oldvalue> section in that entry (step S117 NO), this is an entry that is newly created by this transaction so that this entry is deleted (step S119).

In the case where the value of the TXSTATE attribute is "REMOVE", whether the value of the TXID attribute is "txid" or not is checked (step S120). If so, the TXID attribute and the TXSTATE attribute are deleted (step S121) so as to cancel REMOVE.

Note that, in the case of ABORT, the update of the file made by the transaction to be aborted is cancelled on the buffer region 62. At this point, if there is another already committed transaction that has updated the same file, there is a possibility that the state of being updated by the transaction to be aborted is also already written into the file. However, it is not absolutely necessary to write the file resulting from the cancellation on the buffer region 62 into the hard disk 10 at a time of the ABORT processing. This is because when another transaction updates the same file next and this transaction is committed, the cancellation of the update by the aborted transaction will be correctly reflected on the hard disk 10. Also, even in the case where no transaction updates this file next and the cancellation is forgotten due to a fault in the system, the state of being updated by the non-committed transaction that is remaining in the file on the hard disk 10 will be cancelled at a time of opening this file next by the recovery processing described below.

Next, the processing procedure for recovery will be described.

In the transaction processing system of this embodiment, the file in the state of being updated by the non-committed transaction is written back into the hard disk 10. For this reason, when a fault occurs in the system, the state of being updated will remains and therefore it is necessary to cancel the update left in the state of being updated, by carrying out the recovery processing. In the conventional transaction processing system, such a recovery processing must be carried out completely immediately at a time of the re-activation after a fault occurrence. For this reason, the overhead of the re-activation after a fault has been large. In contrast, in the transaction processing system of this embodiment, it suffices to carry out the recovery processing at a time of reading that file from the hard disk 10 next.

Figure 20:
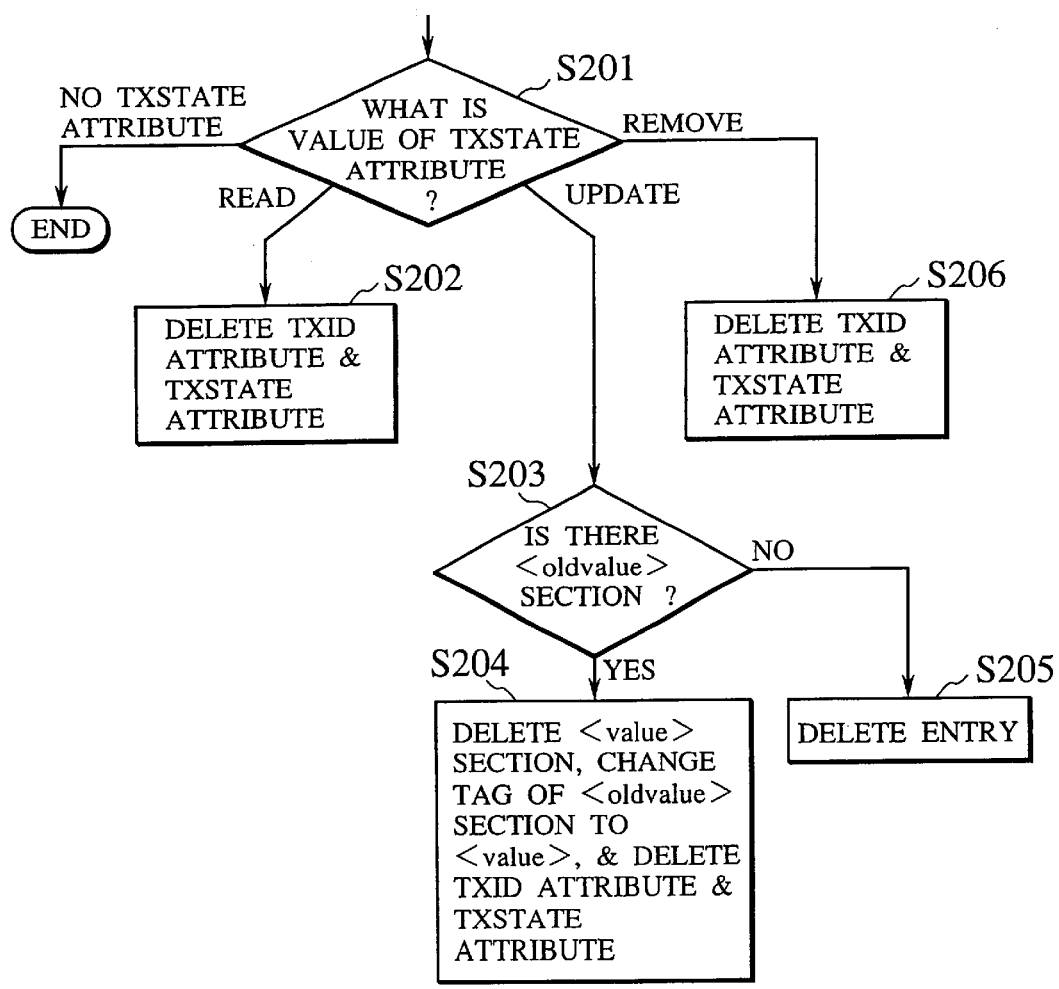
FIG. 20 is a flow chart showing an exemplary processing procedure for recovery in the transaction processing system of FIG. 1.

FIG. 20 shows an exemplary processing procedure for recovery.

When the shared data management unit 4 commands the open processing to the file system 6 in order to refer to a file that is not in the buffer region 62 yet, the file system 6 reads out that file from the hard disk 10 and copies it to the buffer region 62. At this point, the shared data management unit 4 carries out the recovery processing by the procedure shown in FIG. 20 with respect to every entry in the file.

First, the value of the TXSTATE attribute of that entry is checked (step S201).

If there is no TXSTATE attribute, no operation is necessary because no transaction has accessed this entry.

In the case where the value of the TXSTATE attribute is "READ", the TXID attribute and the TXSTATE attribute are deleted (step S202).

In the case where the value of the TXSTATE attribute is "UPDATE", it implies that a fault occurred while some transactions were updating this entry, so that these updates are cancelled. The operation at this point differs depending on whether there is an <oldvalue> section in that entry or not. If there is an <oldvalue> section in that entry (step S203 YES), it is an entry that was existing before the start of that transaction, so that the current <value> section is deleted and the tag name of the <oldvalue> section is changed to <value> so as to have the value before the update back, while the TXID attribute and the TXSTATE attribute are deleted (step S204). If there is no <oldvalue> section in that entry (step S203 NO), this is an entry that is newly created by this transaction so that this entry is deleted (step S205).

In the case where the value of the TXSTATE attribute is "REMOVE", the TXID attribute and the TXSTATE attribute are deleted (step S206) so as to cancel REMOVE.

Note that if such a recovery processing is carried out every time the file is read out from the disk, the overhead becomes very large. For this reason, when the file is written, the file can be attached with an information by which whether that file contains the state of being updated or not can be recognized easily, such that the overhead can be reduced. More specifically, as shown in FIG. 21 for example, the information indicating whether some transactions are currently updating the file or not is provided as an attribute of the route element of the document. In the example of FIG. 21, this is indicated by the attribute TXNUM of the root <KVtable>, which indicates that two transactions, the transaction (1) and the transaction (2), are currently updating the file. In this way, when the file is read out from the disk first, the recovery processing of FIG. 20 is carried out with respect to every entry in that file if its root element has the TXNUM attribute. If there is no TXNUM attribute, the recovery processing is unnecessary.

Now, in the description up to this point, the entry is recorded in a flat structure under the root element <KVtable>, but it is also possible to realize the faster search by using a structure such as the well known binary tree structure, for example. FIG. 22 shows an example of file data in such a case. In this example, the entry has elements called <less> and <greater> in addition to <key> and <value>. The binary tree structure is formed by placing entries having a value of the key less than that element under <less> and entries having a value of the key greater than that element under <greater>. Even in this case, the updates for UPDATE or REMOVE by the transaction can be handled similarly as in the case of using the flat structure. However, there is a need for a processing to re-organize the tree structure by addition or deletion of entries. This processing is exactly the same as the processing for addition/deletion of nodes in the ordinary tree structure. At a time of re-organizing the tree structure, it is also possible to re-organize the tree by using a method such as AVL tree such that branches are well balanced, or re-organize the tree such that entries with higher access frequencies are placed closer to the root of the tree.

It is also possible for the transaction processing system of the present invention to manage files in divisions using a management structure such as the well known B-TREE. FIGS. 23, 24, 25 and 26 show examples of such a case. Here, the entry addition/deletion processing is to be carried out by the same algorithm as in B-TREE where one file contains six entries at most and file is divided when the number of entries exceeds six. In the examples of FIGS. 23, 24, 25 and 26, FILE001 is the root file, and FILE002, FILE003 and FILE004 are files placed under the root file.

Figure 27:
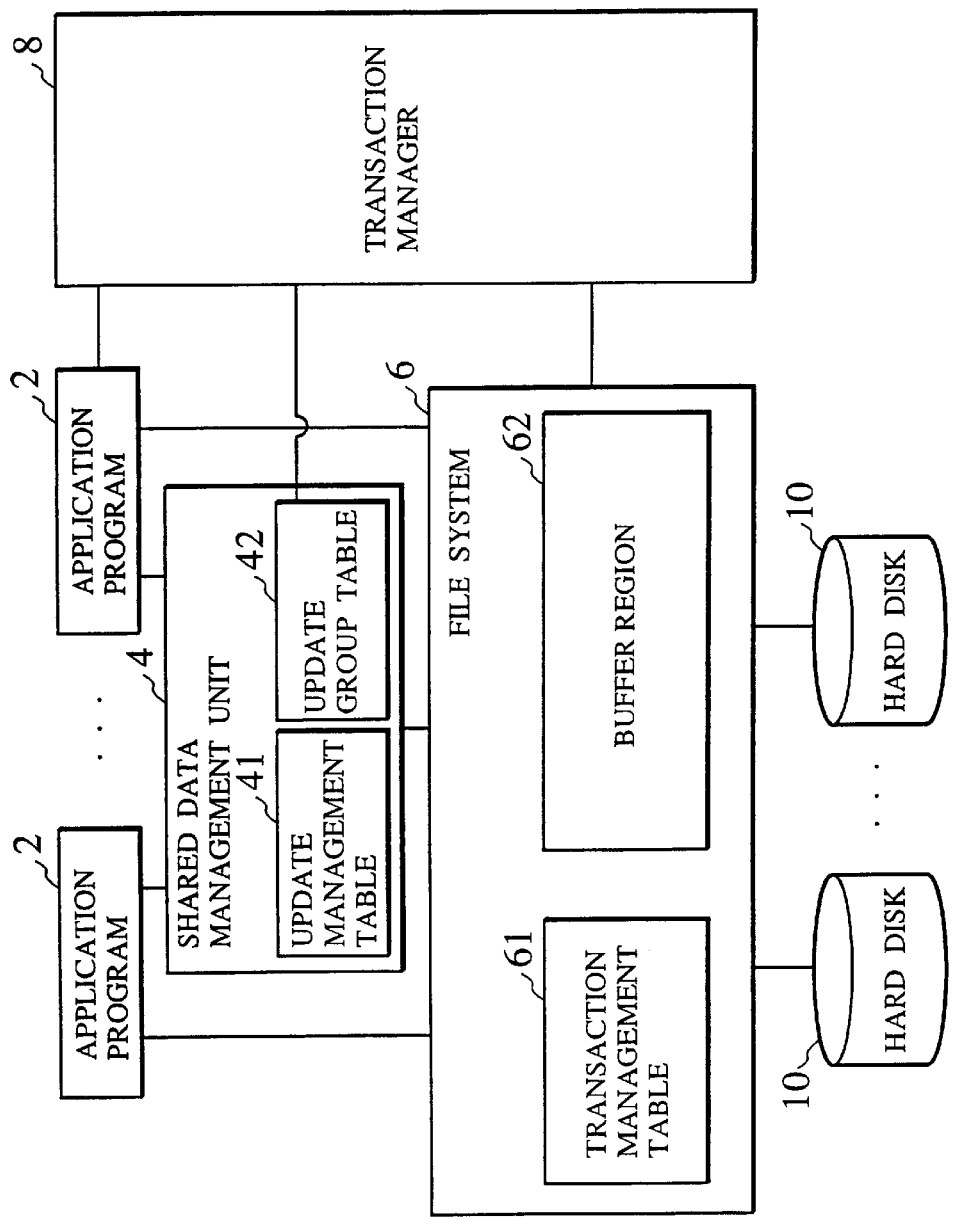
FIG. 27 is a block diagram showing another exemplary configuration of a transaction processing system according to one embodiment of the present invention.
Figure 43:
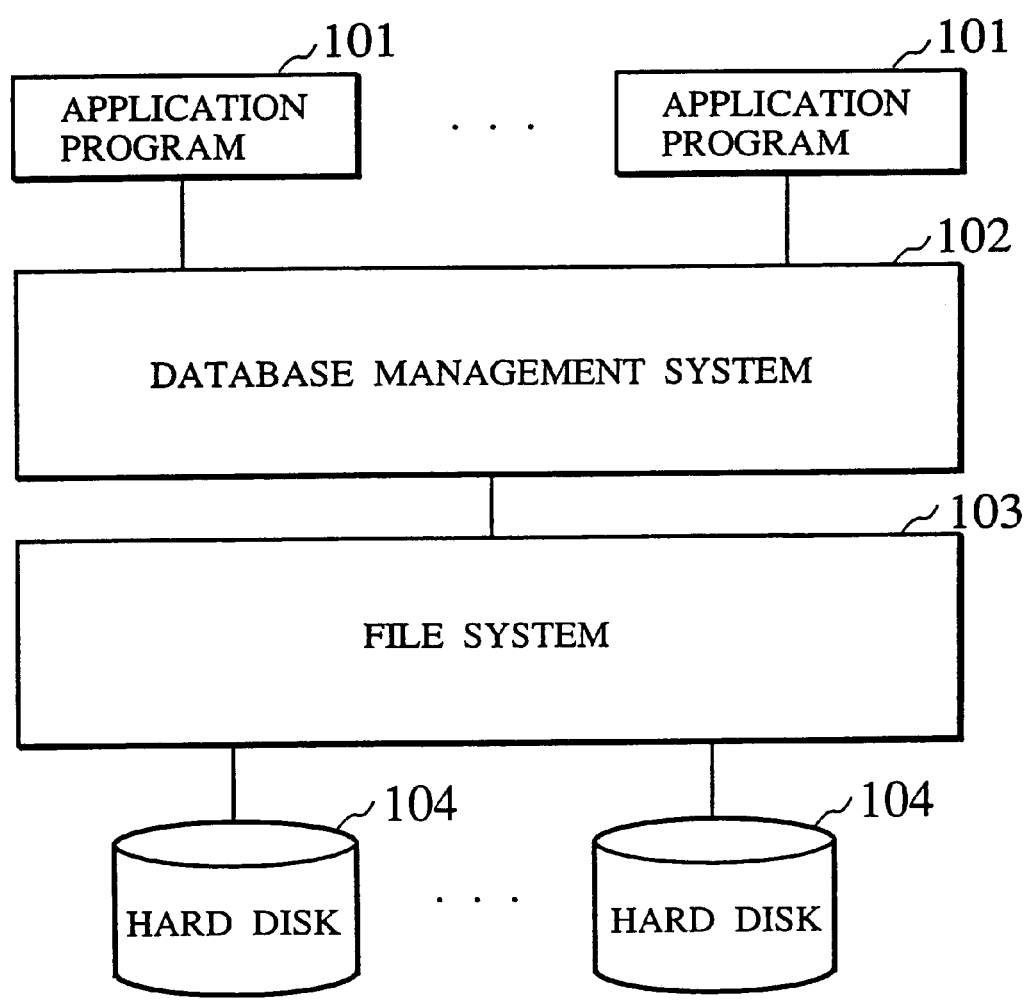
FIG. 43 is a block diagram showing an example of a conventional transaction processing system.

FIG. 27 shows an exemplary configuration of the transaction processing system that records and manages one set of information in divisions into a plurality of files in this way.

The configuration of FIG. 27 differs from that of FIG. 1 in that the shared data management unit 4 has an update group table 42. As will be described below, when the structure among files is changed by moving information among a plurality of files, it is necessary to write these files back into the hard disk 10 concurrently at a time of the commit. The update group table 42 is used for managing such a group of files that must be written back into the hard disk 10 or deleted concurrently at a time of the commit.

FIG. 28 shows an example of the update group table 42. This update group table records member files of each group of files that must be written back or deleted concurrently at a time of the commit. In FIG. 28, FILE001, FILE002 and FILE005 constitute a group, for example.

Now, a procedure for searching an entry having "SESAME" as a key starting from FILE001 of FIGS. 23, 24, 25 and 26 will start from the root of FILE001. First, when the key is compared with "KIWIFRUIT", it is found that the key is greater. Next, when the key is compared with "ROSEMARY" on <greater> side, it is found that the key is greater. Next, when <greater> side is referred, it is a link to FILE004. Consequently, the search is shifted to FILE004, and when the key is compared with "THYME", it is found that the key is less. Next, when <less> side is referred, the entry with a key "SESAME" is found. Once the entry is found in this way, the subsequent operations on the entry are similar to the embodiment described above, such that the state of being updated is preserved in a recoverable form by attaching the TXID attribute and the TXSTATE attribute.

For example, with respect to data in the state of FIGS. 23, 24, 25 and 26, suppose that the transaction (1) updates the value of the entry with the key "ORANGE" to "¥250" and the value of the entry with the key "SESAME" to "¥150", while the transaction (2) that is operated in parallel to the transaction (1) deletes the entry with the key "VODKA". In this state, data of FIGS. 25 and 26 become as shown in FIGS. 29 and 30. The way of having the state of being updated such as UPDATE or REMOVE is the same as in the case of entering all the entries into one file, such that the updated entry is managed by attaching two attributes TXID and TXSTATE.

An exemplary operation in the case where the transaction (1) and the transaction (2) are sequentially committed and aborted respectively in the state of FIGS. 29 and 30 is as follows.

First, at a time of the commit of the transaction (1), the entries updated by the transaction (1) exist only in FILE003 and FILE004. Consequently, data in the state of FIGS. 31 and 32 are obtained by carrying out the commit processing with respect to FILE003 and FILE004, and these data are written back to the hard disk 10 concurrently with the other file updates made by the transaction (1). At this point, the FILE004 contains the state of being updated by the transaction (2) when written back, similarly as in the embodiment described above.

Next, at a time of the abort of the transaction (2), the entry updated by the transaction (2) exists only in FILE004. Consequently, data in the state of FIG. 33 are obtained by carrying out the abort processing with respect to FILE004, and then the abort processing is terminated. There is no need for the write back of the file into the hard disk 10 at a time of the abort processing, similarly as in the embodiment described above.

Now, FIGS. 34, 35 and 36 show a state of data after a new transaction (3) added entries for the key "DODO" and the key "HOOPOE" and set their values as "¥5000000" and "¥980000" respectively in the state at the end of the above described operation. Here, the number of entries that can be entered into one file is predetermined so that when the addition of entries in excess of the capacity of one file is attempted as in this exemplary update, the re-organization among files occurs and entries are moved. In the example of FIGS. 34, 35 and 36, the additions of entries for the key "DODO" and the key "HOOPOE" are both additions to FILE002. Consequently, FILE002 is divided and a new FILE005 is created while entries are moved.

When the moving of entries among files occurs in this way, or when new files are added or conversely files are deleted, the updates of these files must be reflected in the hard disk 10 concurrently. For this reason, the shared data management unit 4 of the transaction processing system of this embodiment manages the update group table 42. In the case where the division of FILE002 occurs as a result of the addition of entries to FILE002 and the update of FILE001 and the creation of FILE005 occur as in the example of FIGS. 34, 35 and 36, the shared data management unit 4 registers FILE001, FILE002 and FILE005 as a single group.

At a time of the commit of the transaction (3), the entries updated by the transaction (3) exist only in FILE001 and FILE005, but it can be ascertained by referring to the update group table 42 that FILE002 must also be written back concurrently. Consequently, three files including FILE001 and FILE005 for which the commit processing is carried out as well as FILE002 are written back into the hard disk 10 as shown in FIGS. 37 and 38.

As described above, in the case of committing one transaction, files containing data that are updated, added, or deleted by that transaction to be committed are selected first as candidates for files to be written back into the hard disk. If the update group table has a group that contains any of these candidate files, all the files of that group are added to the candidate files. By repeating this operation until it becomes impossible to find any further candidate, it is possible to find all the files that must be written back into the hard disk and all the files that must be deleted, at once. The commit processing is completed by writing back these files that must be written back into the hard disk, and deleting these files that must be deleted from the hard disk.

In the present invention, at a time of writing a file updated by the transaction to be committed back into the hard disk, even if another non-committed transaction is in a process of updating the same file, this file will be written back into the hard disk along with data in a process of being updated by the non-committed transaction and information necessary for cancelling that update. At this point, there can be cases involving a movement of data between this file and another file, an addition of a new file or a deletion of some file in conjunction with the update, addition, or deletion of data by the non-committed transaction. In such cases, files added by the non-committed transaction must be also written back into the hard disk and files deleted by the non-committed transaction must be also deleted from the hard disk, because otherwise it will become impossible to cancel the update made by the non-committed transaction if a fault occurs in this state.

The update group table described above records all group relationships among files that must be written back into the hard disk and files that must be deleted from the hard disk concurrently at a time of the commit processing, so that by selecting files by referring to the update group table in the above described commit processing procedure, it is possible to select all the candidate files that must be written back or deleted concurrently at a time of the commit processing of one transaction.

In the case of realizing the transaction processing system of the present invention such that data are stored in division over a plurality of files as described above, it is possible to limit the number of entries that can be entered into one file according to various criteria. For example, it is possible to use a scheme in which the number of entries in one file is limited as in the example of FIGS. 34, 35 and 36, a scheme for limiting the number of entries according to physical sizes of files, a scheme for changing the maximum number of entries according to information such as frequencies of addition/deletion, any combination of these schemes, etc.

The scheme for storing data in division over a plurality of files as in this embodiment has an advantage that the amount of data to be written into the disk at a time of the commit can be reduced if only a part of the entries are updated even when the number of entries is large. In the scheme for entering all entries into one file, there is a need to write back the entire file into the disk at a time of the commit even when only a part of one large file is updated.

Now, the description up to this point has been directed to the exemplary case of applying the present invention to data having a database-like structure of a pair of the key and the value. In the following, the case of applying the present invention to more general XML documents will be described as another example.

FIG. 39 shows an example of a general XML document, and FIG. 40 shows a state of data in which the transaction (1) changed <author> of <chapter> of "<title>NAGOYA</title> to "MISOKATSU" and the transaction (2) added "<chapter><title>HAKATA</title><author>KARASHIMENTAIKO </author></chapter>" in the document of FIG. 39.

After that, data are updated to a state shown in FIG. 41 at a time of the commit of the transaction (1) and these data are written back into the disk.

In addition, data are updated to a state shown in FIG. 42 at a time of the commit of the transaction (2) and these data are written back into the disk.

Even in the case of using such a general XML document as a processing target, a file that is left in the state of being updated due to a fault occurrence is checked at a time of reading this file from the disk next, and the recovery processing for deleting elements with ADD as TXSTATE and leaving elements with REMOVE as TXSTATE is carried out, such that the temporary updates made by the non-committed transaction are cancelled.

As described, according to the present invention, it is possible to realize the updates of files by a plurality of transactions operating in parallel, by a simple processing procedure. In the present invention, there is no need for a complicated processing at a time of the data update, the commit or the recovery, unlike the case of implementing a special log management on the conventional WAL scheme or shadow page scheme.

Also, in the present invention, there is no need to carry out the recovery processing after a fault occurrence completely at a time of the re-activation, and it suffices to carry out the recovery processing at a time of using that file next so that the overhead of the recovery processing is small.

In addition, in the present invention, it is possible to reduce the amount of data to be written back into the disk at a time of committing the file update by managing one data in division over a plurality of files.

Thus, according to the present invention, it becomes possible to provide a transaction processing method and a transaction processing system capable of easily and efficiently realizing the file update processing by a plurality of transactions operating in parallel as well as the recovery processing at a time of a fault occurrence.

In the present invention, when files updated by one transaction are also updated by another transaction at a time of the commit of that transaction, the content of the update made by that another transaction and information for cancelling that update are also written into the file and this file is written into the stable memory device (hard disk, for example), so that it is possible to realize the updates of data of one file by a plurality of transactions in parallel while maintaining the atomicity (the fact that it is possible to guarantee even in the case where a fault occurs in the system, that the updates made by each transaction become either all valid (commit) or all invalid (abort) on the stable memory device, and there is no other state) of transactions, without using a complicated management by providing logs separately from files.

In the case of committing that another transaction that is updating the same file after that one transaction is committed, a file containing the content of the update made by the transaction to be committed later and a part of the content of the update made by the transaction that is committed earlier which is not rewritten by the transaction to be committed later will be overwritten on a file that was written into the stable memory device earlier (which is containing the content of the update made by the transaction to be committed later and information for cancelling that update), so as to maintain the atomicity of the transactions. Note that in the case of aborting that another transaction that is updating the same file after that one transaction is committed, a file in a state where the the update made by the transaction to be aborted is cancelled may be overwritten on a file that was written into the stable memory device earlier (which is containing the content of the update made by the transaction to be committed later and information for cancelling that update), but the atomicity of the transactions can be maintained without any operation at a time of the abort, by carrying out the recovery processing at a time of reading that file next.

Even in the case where a fault occurs in the system before that another transaction that is updating the same file is committed or aborted after that one transaction is committed, the updates made by the committed transaction are already correctly reflected in the file on the stable memory device. In addition, by carrying out the recovery processing, it is possible to cancel the updates made by that another non-committed transaction as if this transaction is aborted, so that the consistency of the transactions can be maintained. Moreover, there is no need to carry out this recovery processing at a time of recovery from the fault, and it suffices to carry out this recovery processing at a time of reading that file next.

Also, by synchronizing the writing for a plurality of files, it is possible to realize the atomic writing that guarantees that the updates with respect to a plurality of files made by one transaction since the start of its processing until the time of the commit become either all valid (commit) or all invalid (abort) on the stable memory device, and there is no other state (there is no possibility for only a part of the updates made by one transaction to become valid while the rest becomes invalid, even in the case where a fault occurs in the system).

It is to be noted that the stable memory device in the above description refers to a memory device such as hard disk, for example, in which the stored content will not disappear even when the power is turned off.

It is also to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the transaction processing system of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A transaction processing system for processing a plurality of transactions, comprising:
    a stable memory device; and
    a file system connected to the stable memory device and having a buffer region for temporarily storing one file used by the plurality of transactions, the file system being configured to realize file operations by transactions and write said one file used by one transaction among the plurality of transactions from the buffer region to the stable memory device at a time of commit of said one transaction, and said one file containing a content of committed updates made by said one transaction, a content of non-committed updates made by other non-committed transactions, and information for canceling the non-committed updates.

2. The transaction processing system of claim 1, wherein the file system is also configured to overwrite an updated file on said one file written into the stable memory device at a time of commit of another transaction among the plurality of transactions, the updated file containing a content of newly committed updates made by said another transaction, and a part of a content of already committed updates made by already committed transactions that does not conflict with the content of newly committed updates.

3. The transaction processing system of claim 1, wherein the file system is also configured to check whether or not a content of non-committed updates made by non-committed transactions and information for canceling the non-committed updates are contained in each file that is newly read out from the stable memory device, and set each file in a state where the non-committed updates are removed by using the information for canceling the non-committed updates when each file contains the content of the non-committed updates and the information for canceling the non-committed updates.

4. The transaction processing system of claim 1, wherein the file system is also configured to write another file into the stable memory device in synchronization with writing of said one file into the stable memory device, when said one transaction also carried out update processing with respect to said another file on the buffer region, said another file containing a content of committed updates with respect to said another file made by said one transaction.

5. The transaction processing system of claim 1, wherein said one file is one of a plurality of files recording one set of information in division.

6. The transaction processing system of claim 5, wherein the file system is also configured to adjust the plurality of files such that a size of each one of the plurality of files conforms with prescribed criteria, by carrying out at least one of an addition of a new file, a moving of data among files, and a deletion of an unnecessary file, on the buffer region in conjunction with the committed updates made by said one transaction, and carry out writing of those file that are newly updated or created by an adjusting operation in conjunction with the committed updates into the stable memory device, and deletion of those files that are deleted by the adjusting operation in conjunction with the committed updates from the stable memory device, atomically with writing of said one file.

7. The transaction processing method of claim 6, wherein the file system is also configured to adjust the plurality of files in conjunction with the non-committed updates made by the other non-committed transactions, and carry out writing of those files that are newly updated or created by the adjusting operation in conjunction with the non-committed updates into the stable memory device, and carry out deletion of those files that are deleted by the adjusting operation in conjunction with the non-committed updates from the stable memory device, atomically with writing of said one file.

8. The transaction processing system of claim 1, wherein the file system is also configured to obtain said one file to be written into the stable memory device by deleting the information for canceling the committed updates made by said one transaction from said one file as updated on the buffer region.

* * * * *